United States Patent [19]

Lips

[11] Patent Number: 5,719,826
[45] Date of Patent: Feb. 17, 1998

[54] CALENDARING SYSTEM

[75] Inventor: Michael D. Lips, San Francisco, Calif.

[73] Assignee: Platinum Technology, Inc., Oakbrook Terrace, Ill.

[21] Appl. No.: 640,703

[22] Filed: May 1, 1996

Related U.S. Application Data

[63] Continuation of Ser. No. 82,356, Jun. 24, 1993, abandoned.

[51] Int. Cl.$^6$ .......................... G04B 19/24; G04B 17/00
[52] U.S. Cl. ........................................ 368/29; 364/705.08
[58] Field of Search .................... 368/10, 28–30, 368/41–43; 40/107; 364/569, 705.08; 235/377

[56] References Cited

U.S. PATENT DOCUMENTS

| | | | |
|---|---|---|---|
| 4,193,255 | 3/1980 | Ebihara et al. | 368/111 |
| 4,274,146 | 6/1981 | Yanagawa | 364/705 |
| 4,380,009 | 4/1983 | Long et al. | 340/151 |
| 4,393,271 | 7/1983 | Fujinami et al. | 179/152 |
| 4,424,567 | 1/1984 | Yasutake | 364/405 |
| 4,748,573 | 5/1988 | Sarandrea et al. | 364/200 |
| 4,812,627 | 3/1989 | Wexler et al. | 235/376 |
| 4,964,072 | 10/1990 | Nara et al. | 364/705.08 |
| 5,040,006 | 8/1991 | Matsumura et al. | 354/106 |

OTHER PUBLICATIONS

Facts on File Dictionary of Astronomy, V. Illingworth, rev. ed., Facts On File, Inc., 1985, pp. 162, 203.
The Norcom Date Routines, Norcom: Northern Computing Consultants, 1986, pp. NDR-1 to NDR-25.
The ABCs of Lotus 1-2-3, B. Kling, 3rd ed., 1991, pp. 96, 103, 384, 386-387.
Mastering SuperCalc5®, G. Harvey, et al., Sybex Inc., 1990, pp. 144-151.
Excel 3 Made Easy, M. Matthews, Osborne McGraw-Hill, 1991, pp. 286-287, 290-291, 391-392, 406, 415.
Using Quattro®, Que™ Corporation, 1988, pp. 143-144, 214-222.
Using Microsoft Works, Que® Corporation, 1989, pp. 226-227.
WordPerfect Office Reference, WordPerfect Corporation, 1990, pp. 427-428, 454-457.
Microsoft® MS-DOS® User's Guide and Reference, Microsoft Corp., 1991, p. 398.
The CICS Programmer's Desk Reference, D. Lowe, Mike Murach & Associates, Inc., pp. 71-72, 102-103.
American National Standard to Information Systems—Programming Language—Intrinsic Function Module for COBOL, American National Standards Institute, Inc., 1989, pp. A-5, A-39-46.
IBM SAA AD/Cycle COBOL/370 Language Reference, Version 1, Release 1, 1st ed., International Business Machines Corporation, 1991, pp. 210-216.
DB2 for the COBOL programmer, Part 2: An Advanced Course, S. Eckols, Mike Murach & Associates, 1992, pp. 28-53.
IBM SAA AD/Cycle Language Environment/370 Programming Guide, Release 2, 3rd ed., IBM Corporation, 1993, pp. 70-73, 485-496, 501-507, 542-546, 633-637.
The Convert Date and Time Format (QWCCVTDT) API, C. Pelkie, Midrange Computing, May 1993, pp. 76-79.
Determining Number of Working Days, T. Adair/E. Malaga, Midrange Computing, Jul. 1993, p. 111.
Look Before You Leap, Midrange Computing, Sep. 1993, p. 18.
Here's One Alternative Date Method . . . , Tick, Tick, Tick . . . , Winter 1993, p. 3.

*Primary Examiner*—Vit W. Miska
*Attorney, Agent, or Firm*—Trial & Technology Law Group

[57] ABSTRACT

A calendaring system which provides accurate calendaring of all dates between Jan. 01, 0001 and Dec. 31, 9999 by implementation of an extended set of leap-year rules. The system includes a variety of additional useful features including: multiple holiday tables; flexible date formats; free form definition of processing days; full support for fiscal calendaring units; changeable endpoint counting modes; and integrated support for the current date in date calendaring calculations.

40 Claims, 39 Drawing Sheets

TRC-CONVR-CONVERSATIONAL  AREA 115

TRC-CONVR-BUSINESS-PARAMETERS.

```
    TRC-CONVR-HOLIDAY-TBL            PIC X(02) VALUE "01".
    TRC-CONVR-FISCYR-START           PIC X(02) VALUE "01".
    TRC-CONVR-FISCMO-START           PIC X(02) VALUE "01".
    TRC-CONVR-END-PNTS-DEF           PIC X(01) VALUE "T".
    TRC-CONVR-DOW-STRING             PIC X(07) VALUE "1234567".
    TRC-CONVR-PROC-DAY-DEF           PIC X(07) VALUE "NEEEEEN".
    TRC-CONVR-CENTURY-BREAK          PIC X(08) VALUE "19/20;50".
    TRC-CONVR-FROM-DATE-MASK         PIC X(08) VALUE "YYMMDD- -".
    TRC-CONVR-TO-DATE-MASK           PIC X(08) VALUE "- -YYMMDD".
    TRC-CONVR-OUT1-DATE-MASK         PIC X(08) VALUE "YYMMDD- -".
    TRC-CONVR-OUT2-DATE-MASK         PIC X(08) VALUE "- -YYMMDD".
    TRC-CONVR-OUT3-DATE-MASK         PIC X(08) VALUE "- CCYYDDD".
    FILLER                           PIC X(20) VALUE SPACE.
```

TRC-CONVR-INPUT-PARAMETERS.

```
    TRC-CONVR-FUNCTION-CODE.
       15   TRC-CONVR-FUNCTION-TYPE     PIC X.
       15   TRC-CONVR-FUNCTION-NUMBER   PIC X(3).
    TRC-CONVR-FROM-DATE-X              PIC X(8).
    TRC-CONVR-FROM-DATE-9 REDEFINES
         TRC-CONVR-FROM-DATE-X         PIC 9(8).
    TRC-CONVR-TO-DATE-X                PIC X(8).
    TRC-CONVR-TO-DATE-9 REDEFINES
         TRC-CONVR-TO-DATE-X           PIC 9(8).
    TRC-CONVR-IN-NUMERIC-PARM          PIC S9(8) SIGN IS
                                       LEADING SEPERATE.
    TRC-CONVR-IN-ALPHA-PARM            PIC X(7).
    FILLER                             PIC X(20) VALUE SPACE.
```

TRC-CONVR-INPUT-PARAMETERS.

```
    TRC-CONVR-RETURN-CODE.
       15   TRC-CONVR-RETURN-NUM       PIC 9(3).
       88   TRC-CONVR-RETURN-GOOD      VALUE 000.
       88   TRC-CONVR-RETURN-BAD       VALUE 001 THRU 999.
       15   TRC-CONVR-RETURN-TEXT      PIC X(80).
    TRC-CONVR-STDOUT-DATE-X            PIC X(8).
    TRC-CONVR-STDOUT-DATE-9 REDEFINES
         TRC-CONVR-STDOUT-DATE-X       PIC 9(8).
    TRC-CONVR-OUT1-DATE-X              PIC X(8).
    TRC-CONVR-OUT1-DATE-9 REDEFINES
         TRC-CONVR-OUT1-DATE-X         PIC 9(8).
    TRC-CONVR-OUT2-DATE-X              PIC X(8).
    TRC-CONVR-OUT2-DATE-9 REDEFINES
         TRC-CONVR-OUT2-DATE-X         PIC 9(8).
    TRC-CONVR-OUT3-DATE-X              PIC X(8).
    TRC-CONVR-OUT3-DATE-9 REDEFINES
         TRC-CONVR-OUT3-DATE-X         PIC 9(8).
    TRC-CONVR-OUT-NUMERIC-PARM         PIC S9(8) SIGN IS
                                       LEADING SEPERATE.
    FILLER                             PIC X(20) VALUE SPACE.
```

FILLER                             PIC X(111) VALUE SPACE.

FIG. 3

|  |  | HOLIDAY FILE | | |
|---|---|---|---|---|
|  |  | No Input | Input is Provided | |
|  |  |  | Good Input | Bad Input |
| PRINT FILE 625 | Error Report 630 | No | No | Yes |
|  | Control Report 631 | Yes | Yes | Yes |
|  | Calendar Listings 632 | No | Yes | No |
| COPYBOOK 620 | | Yes | Yes | No |

FIG. 5b

| Applicable Parameters | |
|---|---|
| Business: | 1. OUT1-DATE-MASK |
| Input: | 1. FUNCTION-CODE |
| Output: | 1. OUT1-DATE |

| Example 1 | |
|---|---|
| Before Call | After Call |
| CCYYMMDD | |
| U001 | |
| | 19930517 |

| Example 2 | |
|---|---|
| Before Call | After Call |
| CCYYMMDD | |
| U001 | |
| | 19931705 |

FIG. 6

| Applicable Parameters | |
| --- | --- |
| Business: | 1. FROM-DATE-MASK |
| Input: | 1. FUNCTION-CODE<br>2. FROM-DATE |
| Output: | 1. RETURN-NUM<br>2. OUT-NUMERIC-PARM |

| Example 1 | |
| --- | --- |
| Before Call | After Call |
| CCYYMMDD | |
| U002<br>19930217 | |
| | 000<br>1 |

| Example 2 | |
| --- | --- |
| Before Call | After Call |
| CCYYMMDD | |
| U002<br>199302W9 | |
| | 014<br>0 |

FIG. 7

| Applicable Parameters | |
|---|---|
| Business: | 1. FROM-DATE-MASK |
| Input: | 1. FUNCTION-CODE<br>2. FROM-DATE |
| Output: | 1. OUT-NUMERIC-PARM |

| Example 1 | |
|---|---|
| Before Call | After Call |
| CCYYMMDD | |
| U003<br>20001225 | |
| | 1 |

| Example 2 | |
|---|---|
| Before Call | After Call |
| MMCCYYDD | |
| U003<br>12199525 | |
| | 0 |

FIG. 8

| Applicable Parameters | |
|---|---|
| Business: | 1. HOLIDAY-TBL<br>2. FROM-DATE-MASK |
| Input: | 1. FUNCTION-CODE<br>2. FROM-DATE |
| Output: | 1. OUT-NUMERIC-PARM |

| Example 1 | |
|---|---|
| Before Call | After Call |
| 04<br>CCYYMMDD | |
| U004<br>19960704 | |
| | 1 |

| Example 2 | |
|---|---|
| Before Call | After Call |
| 04<br>CCYYMMDD | |
| U004<br>19940203 | |
| | 0 |

FIG. 9

| Applicable Parameters | |
|---|---|
| Business: | 1. HOLIDAY-TBL<br>2. FROM-DATE-MASK<br>3. PROC-DAY-DEF |
| Input: | 1. FUNCTION-CODE<br>2. FROM-DATE |
| Output: | 1. OUT1-DATE |

| Example 1 | |
|---|---|
| Before Call | After Call |
| 05<br>CCYYMMDD<br>'AAAAAA' | |
| U005<br>19920217 | 1 |

| Example 2 | |
|---|---|
| Before Call | After Call |
| 05<br>CCYYMMDD<br>'NEEEEEN' | |
| U005<br>19920217 | 0 |

FIG. 10

| Applicable Parameters | |
|---|---|
| Business: | 1. FROM-DATE-MASK<br>2. DOW-STRING |
| Input: | 1. FUNCTION-CODE<br>2. FROM-DATE |
| Output: | 1. OUT-NUMERIC-PARM |

| Example 1 | |
|---|---|
| Before Call | After Call |
| CCYYMMDD<br>1234567 | |
| U006<br>19920217 | |
| | 2 |

| Example 2 | |
|---|---|
| Before Call | After Call |
| CCYYMMDD<br>0123456 | |
| U006<br>19930519 | |
| | 3 |

FIG. 11

| Applicable Parameters | |
|---|---|
| Business: | 1. FROM-DATE-MASK |
| Input: | 1. FUNCTION-CODE<br>2. FROM-DATE |
| Output: | 1. OUT-NUMERIC-PARM |

| Example 1 | |
|---|---|
| Before Call | After Call |
| CCYYMMDD | |
| U007<br>00010101 | 1 |
| | |

| Example 2 | |
|---|---|
| Before Call | After Call |
| CCYYMMDD | |
| U007<br>20050101 | |
| | 731947 |

FIG. 12

| Applicable Parameters | |
|---|---|
| Business: | 1. OUT1-DATE-MASK |
| Input: | 1. FUNCTION-CODE<br>2. IN-NUMERIC-PARM |
| Output: | 1. OUT1-DATE |

| Example 1 | |
|---|---|
| Before Call | After Call |
| CCYYMMDD | |
| U008<br>1 | |
| | 00010101 |

| Example 2 | |
|---|---|
| Before Call | After Call |
| CCYYMMDD | |
| U008<br>731947 | |
| | 20050101 |

FIG. 13

| Applicable Parameters | |
|---|---|
| Business: | 1. FROM-DATE-MASK<br>2. OUT1-DATE-MASK<br>3. OUT2-DATE-MASK<br>4. OUT3-DATE-MASK |
| Input: | 1. FUNCTION-CODE<br>2. FROM-DATE |
| Output: | 1. STDOUT-DATE<br>2. OUT1-DATE<br>3. OUT2-DATE<br>4. OUT3-DATE |

| Example 1 | |
|---|---|
| Before Call | After Call |
| CCYYMMDD<br>CCYYDDMM<br>YYMMDD--<br>-CCYYDD | |
| U009<br>19920301 | |
| | 19920301<br>19920103<br>920301<br>01992061 |

| Example 2 | |
|---|---|
| Before Call | After Call |
| CCYYMMDD<br>CCYYDDMM<br>YYMMDD--<br>-CCYYDD | |
| U009<br>19930301 | |
| | 19930301<br>19930103<br>930301<br>01993060 |

FIG. 14

| Applicable Parameters | |
|---|---|
| Business: | 1. HOLIDAY-TBL<br>2. FROM-DATE-MASK<br>3. TO-DATE-MASK<br>4. PROC-DAY-DEF<br>5. END-PNTS-DEF |
| Input: | 1. FUNCTION-CODE<br>2. FROM-DATE<br>3. TO-DATE |
| Output: | 1. OUT-NUMERIC-PARM |

| Example 1 | |
|---|---|
| Before Call | After Call |
| 06<br>CCYYMMDD<br>CCYYMMDD<br>'NEEEEEN'<br>'T' | |
| C101<br>19930903<br>19930907 | +4 |

| Example 2 | |
|---|---|
| Before Call | After Call |
| 06<br>CCYYMMDD<br>CCYYMMDD<br>'NEEEEEN'<br>'T' | |
| P101<br>19930903<br>19930907 | +1 |

FIG. 15a

| Applicable Parameters | |
|---|---|
| Business: | 1. HOLIDAY-TBL<br>2. FROM-DATE-MASK<br>3. TO-DATE-MASK<br>4. PROC-DAY-DEF<br>5. END-PNTS-DEF |
| Input: | 1. FUNCTION-CODE<br>2. FROM-DATE<br>3. TO-DATE |
| Output: | 1. OUT-NUMERIC-PARM |

| Example 3 | |
|---|---|
| Before Call | After Call |
| 06<br>CCYYMMDD<br>CCYYMMDD<br>'NEEEEEN'<br>'T' | |
| C101<br>19930907<br>19930903 | |
| | -4 |

| Example 4 | |
|---|---|
| Before Call | After Call |
| 06<br>CCYYMMDD<br>CCYYMMDD<br>'NEEEEEN'<br>'T' | |
| P101<br>19930907<br>19930903 | |
| | -1 |

FIG. 15b

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example 1 | |
|---|---|
| Before Call | After Call |
| 06<br>CCYYMMDD<br>CCYYMMDD<br>'NEEEEEN'<br>'T' | |
| C102<br>19930903<br>+4 | |
| | 19930907 |

| Example 2 | |
|---|---|
| Before Call | After Call |
| 06<br>CCYYMMDD<br>CCYYMMDD<br>'NEEEEEN'<br>'T' | |
| P102<br>19930903<br>+4 | |
| | 19930910 |

FIG. 16a

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example 3 | |
|---|---|
| Before Call | After Call |
| 06<br>CCYYMMDD<br>CCYYMMDD<br>'NEEEEEN'<br>'T' | |
| C102<br>19930907<br>-4 | 19930903 |

| Example 4 | |
|---|---|
| Before Call | After Call |
| 06<br>CCYYMMDD<br>CCYYMMDD<br>'NEEEEEN'<br>'T' | |
| P102<br>19930910<br>-4 | 19930903 |

FIG. 16b

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE |
| Output: | 1. OUT1-DATE |

| Example 1 | |
|---|---|
| Before Call | After Call |
| 07<br>CCYYMMDD<br>CCYYMMDD<br>'NEEEEEN'<br>'T'<br>C201<br>19930212 | 19930213 |

| Example 2 | |
|---|---|
| Before Call | After Call |
| 07<br>CCYYMMDD<br>CCYYMMDD<br>'NEEEEEN'<br>'T'<br>P201<br>19930212 | 19930216 |

FIG. 17

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE |
| Output: | 1. OUT1-DATE |

| Example 1 | |
|---|---|
| Before Call | After Call |
| 07<br>CCYYMMDD<br>CCYYMMDD<br>'NEEEEEN'<br>'T' | |
| C202<br>19930216 | 19930215 |

| Example 2 | |
|---|---|
| Before Call | After Call |
| 07<br>CCYYMMDD<br>CCYYMMDD<br>'NEEEEEN'<br>'T' | |
| P202<br>19930216 | 19930212 |

FIG. 18

| Applicable Parameters | |
|---|---|
| Business: | 1. HOLIDAY-TBL<br>2. FROM-DATE-MASK<br>3. PROC-DAY-DEF<br>4. END-PNTS-DEF |
| Input: | 1. FUNCTION-CODE<br>2. FROM-DATE |
| Output: | 1. OUT-NUMERIC-PARM |

| Example 1 | |
|---|---|
| Before Call | After Call |
| 05<br>CCYYMMDD<br>'NEEEEEN'<br>'T' | |
| C203<br>19940706 | -5 |

| Example 2 | |
|---|---|
| Before Call | After Call |
| 05<br>CCYYMMDD<br>'NEEEEEN'<br>'T' | |
| P203<br>19940706 | -2 |

FIG. 19

| Applicable Parameters | |
|---|---|
| Business: | 1. HOLIDAY-TBL<br>2. FROM-DATE-MASK<br>3. PROC-DAY-DEF<br>4. END-PNTS-DEF |
| Input: | 1. FUNCTION-CODE<br>2. FROM-DATE |
| Output: | 1. OUT-NUMERIC-PARM |

| Example 1 | |
|---|---|
| Before Call | After Call |
| 08<br>CCYYMMDD<br>'NEEEEEN'<br>'T' | |
| C204<br>19921223 | |
| | +8 |

| Example 2 | |
|---|---|
| Before Call | After Call |
| 08<br>CCYYMMDD<br>'NEEEEEN'<br>'T' | |
| P204<br>19921223 | |
| | +5 |

FIG. 20

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example 1 | |
|---|---|
| Before Call | After Call |
| 05<br>CCYYMMDD<br>CCYYMMDD<br>'NEEEEEN'<br>'T' | |
| C205<br>19940723<br>+5 | |
| | 19940706 |

| Example 2 | |
|---|---|
| Before Call | After Call |
| 05<br>CCYYMMDD<br>CCYYMMDD<br>'NEEEEEN'<br>'T' | |
| P205<br>19940723<br>+5 | |
| | 19940711 |

FIG. 21

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example 1 | |
|---|---|
| Before Call | After Call |
| 08<br>CCYYMMDD<br>CCYYMMDD<br>'NEEEEEN'<br>'T' | |
| C206<br>19921205<br>-4 | 19921227 |

| Example 2 | |
|---|---|
| Before Call | After Call |
| 08<br>CCYYMMDD<br>CCYYMMDD<br>'NEEEEEN'<br>'T' | |
| P206<br>19921218<br>-4 | 19921224 |

FIG. 22

| Applicable Parameters | |
|---|---|
| Business: | 1. HOLIDAY-TBL<br>2. FROM-DATE-MASK<br>3. OUT1-DATE-MASK<br>4. PROC-DAY-DEF |
| Input: | 1. FUNCTION-CODE<br>2. FROM-DATE<br>3. IN-NUMERIC-PARM<br>4. IN-ALPHA-PARM |
| Output: | 1. OUT1-DATE |

| Example 1 | |
|---|---|
| Before Call | After Call |
| 08<br>CCYYMMDD<br>CCYYMMDD<br>'NEEEEEN' | |
| C207<br>19921228<br>-2<br>'NNNNNYN' | 19921218 |

| Example 2 | |
|---|---|
| Before Call | After Call |
| 08<br>CCYYMMDD<br>CCYYMMDD<br>'NEEEEEN' | |
| P207<br>19921228<br>-2<br>'NNNNNYN' | 19921211 |

FIG. 23

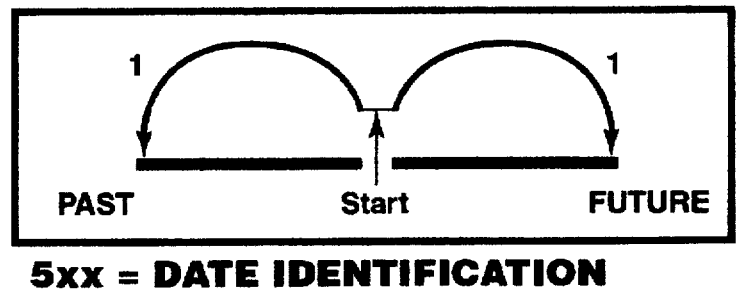
5xx = DATE IDENTIFICATION
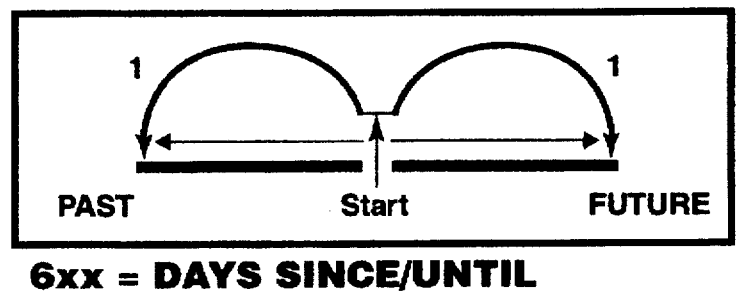
6xx = DAYS SINCE/UNTIL
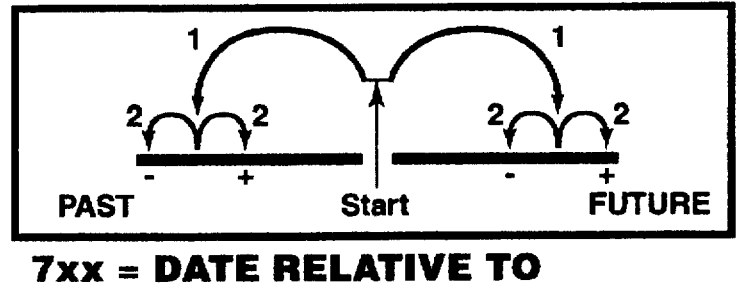
7xx = DATE RELATIVE TO
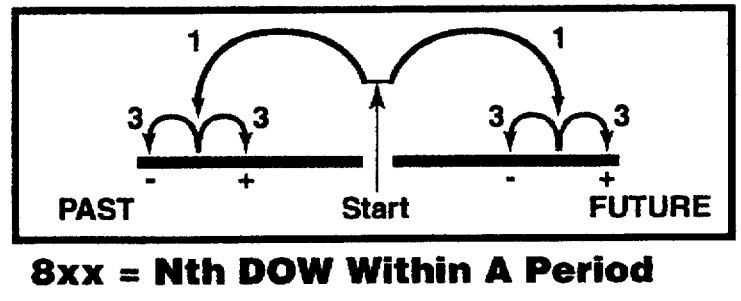
8xx = Nth DOW Within A Period

| Applicable Parameters | |
|---|---|
| Business: | 1. HOLIDAY-TBL<br>2. FROM-DATE-MASK<br>3. OUT1-DATE-MASK<br>4. FISCYR-START<br>5. PROC-DAY-DEF<br>6. END-PNTS-DEF |
| Input: | 1. FUNCTION-CODE<br>2. FROM-DATE |
| Output: | 1. OUT1-DATE |

| Example C51 | |
|---|---|
| Before Call | After Call |
| 08<br>CCYYMMDD<br>CCYYMMDD<br>04<br>'NEEEEEN'<br>'T' | |
| C519<br>CURRDATE | 19930101 |

| Example P51 | |
|---|---|
| Before Call | After Call |
| 08<br>CCYYMMDD<br>CCYYMMDD<br>04<br>'NEEEEEN'<br>'T' | |
| P519<br>CURRDATE | 19930104 |

FIG. 25a

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE |
| Output: | 1. OUT1-DATE |

| Example C52 | |
|---|---|
| Before Call | After Call |
| 08<br>CCYYMMDD<br>CCYYMMDD<br>'NEEEEEN'<br>'T' | |
| C504<br>19931129 | 19931231 |

| Example P52 | |
|---|---|
| Before Call | After Call |
| 08<br>CCYYMMDD<br>CCYYMMDD<br>'NEEEEEN'<br>'T' | |
| P504<br>19931129 | 19931230 |

FIG. 25b

| Applicable Parameters | |
|---|---|
| Business: | 1. HOLIDAY-TBL<br>2. FROM-DATE-MASK<br>3. FISCYR-START<br>4. PROC-DAY-DEF<br>5. END-PNTS-DEF |
| Input: | 1. FUNCTION-CODE<br>2. FROM-DATE |
| Output: | 1. OUT-NUMERIC-PARM |

| Example C61 | |
|---|---|
| Before Call | After Call |
| 08<br>CCYYMMDD<br>04<br>'NEEEEEN'<br>'T' | |
| C619<br>CURRDATE | -136 |

| Example P61 | |
|---|---|
| Before Call | After Call |
| 08<br>CCYYMMDD<br>04<br>'NEEEEEN'<br>'T' | |
| P619<br>CURRDATE | -95 |

FIG. 26a

| Applicable Parameters | |
|---|---|
| Business: | 1. HOLIDAY-TBL<br>2. FROM-DATE-MASK<br>3. PROC-DAY-DEF<br>4. END-PNTS-DEF |
| Input: | 1. FUNCTION-CODE<br>2. FROM-DATE |
| Output: | 1. OUT-NUMERIC-PARM |

| Example C62 | |
|---|---|
| Before Call | After Call |
| 08<br>CCYYMMDD<br>'NEEEEEN'<br>'T' | |
| C604<br>19931129 | |
| | +32 |

| Example P62 | |
|---|---|
| Before Call | After Call |
| 08<br>CCYYMMDD<br>'NEEEEEN'<br>'T' | |
| P604<br>19931129 | |
| | +22 |

FIG. 26b

| Applicable Parameters | |
|---|---|
| Business: | 1. HOLIDAY-TBL<br>2. FROM-DATE-MASK<br>3. OUT1-DATE-MASK<br>4. FISCYR-START<br>5. PROC-DAY-DEF<br>6. END-PNTS-DEF |
| Input: | 1. FUNCTION-CODE<br>2. FROM-DATE<br>3. IN-NUMERIC-PARM |
| Output: | 1. OUT1-DATE |

| Example C71 | |
|---|---|
| Before Call | After Call |
| 08<br>CCYYMMDD<br>CCYYMMDD<br>04<br>'NEEEEEN'<br>'T' | |
| C719<br>CURRDATE<br>+5 | 19930106 |

| Example P71 | |
|---|---|
| Before Call | After Call |
| 08<br>CCYYMMDD<br>CCYYMMDD<br>04<br>'NEEEEEN'<br>'T' | |
| P719<br>CURRDATE<br>+5 | 19930111 |

FIG. 27a

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM |
| Output: | 1. OUT1-DATE |

| Example C72 | |
|---|---|
| Before Call | After Call |
| 08<br>CCYYMMDD<br>CCYYMMDD<br>'NEEEEEN'<br>'T' | |
| C704<br>19931129<br>-6 | |
| | 19931225 |

| Example P72 | |
|---|---|
| Before Call | After Call |
| 08<br>CCYYMMDD<br>CCYYMMDD<br>'NEEEEEN'<br>'T' | |
| P704<br>19931129<br>-6 | |
| | 19931221 |

FIG. 27b

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM<br>4. IN-ALPHA-PARM |
| Output: | 1. RETURN-NUM<br>2. OUT1-DATE |

| Example C81 | |
|---|---|
| Before Call | After Call |
| 08<br>CCYYMMDD<br>CCYYMMDD<br>'NEEEEEN'<br>'T' | |
| C827<br>19921215<br>+4<br>'NNNNNYN' | 000<br>19921225 |

| Example P81 | |
|---|---|
| Before Call | After Call |
| 08<br>CCYYMMDD<br>CCYYMMDD<br>'NEEEEEN'<br>'T' | |
| P827<br>19921215<br>+4<br>'NNNNNYN' | 054 |

FIG. 28a

| Applicable Parameters | |
|---|---|
| Business: | 1. HOLIDAY-TBL<br>2. FROM-DATE-MASK<br>3. OUT1-DATE-MASK<br>4. PROC-DAY-DEF<br>5. END-PNTS-DEF |
| Input: | 1. FUNCTION-CODE<br>2. FROM-DATE<br>3. IN-NUMERIC-PARM<br>4. IN-ALPHA-PARM |
| Output: | 1. RETURN-NUM<br>2. OUT1-DATE |

| Example C82 | |
|---|---|
| Before Call | After Call |
| 08<br>CCYYMMDD<br>CCYYMMDD<br>'NEEEEEN'<br>'T' | |
| C828<br>19921215<br>-4<br>'NNNNNYN' | |
| | 000<br>19921204 |

| Example P82 | |
|---|---|
| Before Call | After Call |
| 08<br>CCYYMMDD<br>CCYYMMDD<br>'NEEEEEN'<br>'T' | |
| P828<br>19921215<br>-4<br>'NNNNNYN' | |
| | 053 |

FIG. 28b

CALENDARING SYSTEM

This is a continuation of application Ser. No. 08/082,356, filed Jun. 24, 1993 now abandoned.

CROSS-REFERENCE TO DISCLOSURE DOCUMENT

The present application is cross-referenced to Disclosure Document No. 287,622 received in the Patent and Trademark Office on Jul. 26, 1991.

BACKGROUND OF THE INVENTION

The present invention relates generally to calendaring systems, and particularly to a calendaring system which is accurate for all dates between Jan. 1, 0001 and Dec. 31, 9999, and which includes additional new and useful features.

The year 2000 is rapidly approaching and there are a number of reasons why the upcoming century transition, 1999 to 2000, poses problems to data processing calendaring systems. First, data processing systems that examine only the last two digits of the year may conclude, for instance, that the year 2000 is earlier than the year 1999, simply because 00 is less than 99. This is known as "inversion of years." Second, although the year 2000 is a leap year, data processing systems that have incomplete leap-year sensitive logic may not be aware that the year 2000 is a leap year, though the years 1900 and 2100 are not. Third, since the year 2000 ends in the digits '00', data processing systems that divide by the two-digit representation of the year run the risk of terminating abnormally.

The calendaring system of the present invention addresses these, and other calendar-related problems. The system can handle any four digit year, i.e., any year from 0001 through 9999. The system uses a set of rules which distinguishes all leap years from nonleap years in this range.

Leap-year rules were initiated in 46 B.C. by Julius Caesar, and modified in 1582 by Pope Gregory XIII. In the Julian calendar a leap year of 366 days occurs once every four years. Over the course of sixteen centuries this approach produced eleven days of error. In the leap year rules instituted by Pope Gregory XIII, a calendar year that is a multiple of 100 is not a leap year unless it is also a multiple of 400. The resulting Gregorian calendar represents a significant improvement over the Julian calendar and yields only about three days of error every 10,000 years.

The calendaring system of the present invention spans 10,000 years and so it is necessary to enhance the leap year rules further still. The leap-year rule of the present invention generates only one day of error every fifty thousand years. The result is a set of conversion processes that accurately handles dates ranging from Jan. 01, 0001 through Dec. 31, 9999. Dates prior to 1582 are handled as backward projections of the rules defined in 1582.

There are a variety of additional features and options available within the system of the present invention. These features and options have been selected to provide a calendaring system which should perform most any required calendaring function. The many features and options of the present invention are useful per se, and in combination provide a synergistic advantage by virtue of their completeness in that the user will not need to augment the calendaring functions provided.

The system allows the user to choose among ten different holiday tables. This can be useful if the user conducts business with outside areas of commerce, such as foreign commerce, or if various areas of the user's shop observe different holiday schedules.

The system also allows the user to specify dates in any of fifty-two different date formats. The system permits the user to define each day of the week as a processing day or a nonprocessing day. When processing and nonprocessing days are defined, holidays may be taken into consideration. The system also allows the user to select any of the twelve months as the start of the fiscal year, and permits the user to specify day 01 through 28 as the start of the fiscal month. Additionally, the system allows the user to specify whether the FROM-DATE and/or the TO-DATE should be counted in calendaring calculations. The system also provides implicit and explicit access to the current date.

The system offers the user over three hundred functions. These functions fall into three basic groups: utility functions, calendar day functions, and processing day functions. Calendar day functions perform date calculations based on calendar days, and processing day functions perform date calculations based on processing days. Utility functions perform date calculations which are independent of calendar day and/or processing day considerations. Functions provided by the system allow for date calculations based on calendar or fiscal time units, i.e. years, months or quarters.

It is therefore an object of the present invention to provide a calendaring system accurate from Jan. 01, 0001 to Dec. 31, 9999.

Another object of the present invention is to provide a calendaring program with multiple holiday tables.

Another object of the present invention is to provide a calendaring program where the user can select among a large number of date formats.

Another object of the present invention is to provide a calendaring program which allows the user to define each day of the week as a processing day or a nonprocessing day.

Another object of the present invention is to provide a calendaring program which allows processing days to be determined based on holidays and the day of the week.

Another object of the present invention is to provide a calendaring program which provides full support for date calculations based on calendar and fiscal years, quarters, and months.

Another object of the present invention is to provide a calendaring program which allows the user to specify how period endpoints are counted.

Another object of the present invention is to provide a calendaring program with implicit and explicit access to the current date.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a calendaring system which provides accurate calendaring of all dates between Jan. 1, 0001, and Dec. 31, 9999. The present invention is also directed to a calendaring system having one or more of the following features: multiple holiday tables; flexible date formats; conversion between date formats; versatile definitions of processing days; full support for calendar and fiscal time units; specification of how period endpoints are to be counted; and integrated support for the current date.

BRIEF DESCRIPTION OF THE DRAWINGS

The accompanying drawings, which are incorporated in and constitute a part of the specification, schematically illustrate a preferred embodiment of the invention and, together with the general description of the preferred embodiment given below, serve to explain the principles of the invention.

FIG. 3 is a list of input and output parameters for the calendaring system of the present invention.

FIG. 4b is a flow chart for the method of calculation of the absolute days corresponding to a given date according to the method of determination of leap years shown in FIG. 4a.

FIG. 5b is a table showing which reports and listings are generated when the input is good, bad, or nonexistent.

FIGS. 6–14, 15a–b, 16a–b, 17–23, 24a–d, 25a–b, 26a–b, 27a–b, and 28a–b show examples of function calls according to the methods of the present invention.

DETAILED DESCRIPTION OF THE PREFERRED EMBODIMENT

Figure 1A:
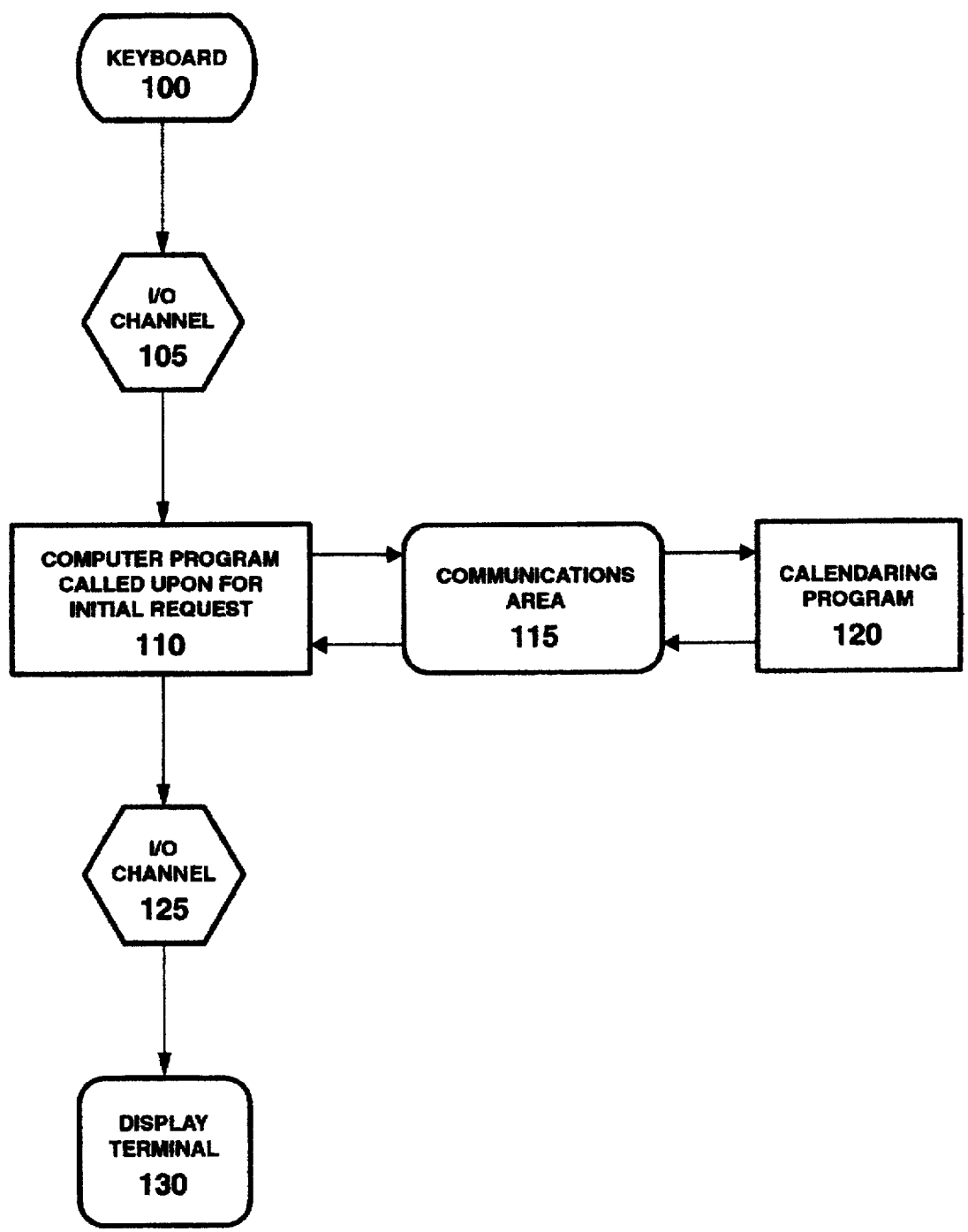
FIG. 1a is a schematic representation of a computer system utilizing the calendaring system of the present invention.

The present invention will be described in terms of a preferred embodiment. The preferred embodiment is an apparatus and method for versatile and accurate calendaring. FIG. 1 is a schematic of a computer system utilizing the calendaring system of the present invention. A processing request is initiated at a human interface unit such as a keyboard 100 and is passed via an I/O channel 105 to a computer program 110. Such a request may, for instance, be a request to a database to determine units of a particular type shipped from a particular factory during a particular period. The aforementioned period may be specified as an initial date and a time period from that date. However, the database may only be equipped to handle requests which specify an initial date and a final date. Therefore, communications area 115 provides an interface for transferring the date request to the calendaring program of the present invention 120 which handles date computations. The date computation is performed by the calendaring program 120 and transferred back to the calling program 110 via the communications area 115. The calling program 110 then completes the computation of the request and forwards the answer via an I/O channel 125 to an output device such as a display terminal 130.

Figure 1B:
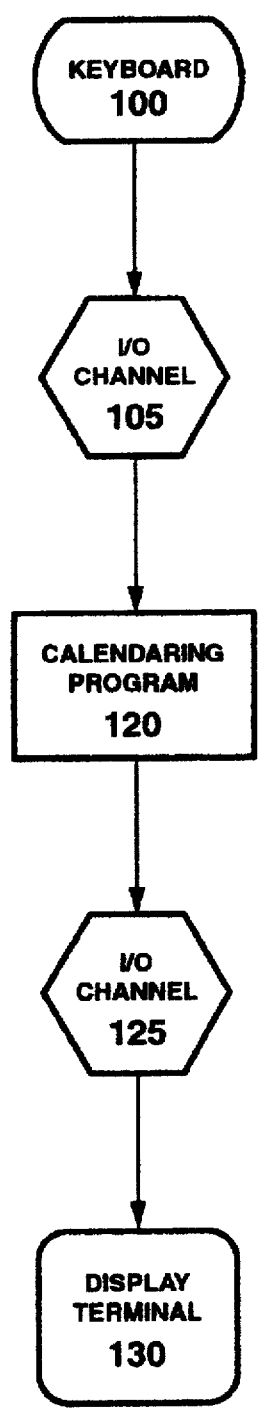
FIG. 1b is a schematic representation of an alternate computer system utilizing the calendaring system of the present invention.

FIG. 1b shows an alternate computer system utilizing the calendaring system of the present invention. In this system the calendaring program is accessed directly by the user. A processing request is initiated at a human interface unit such as a keyboard 100 and is passed via an I/O channel 105 to a computer program 110. Such a request may, for instance, be a request for the number of processing days between an initial date and a final date. A communications area (not shown in FIG. 1b) receives the request for the calendaring program of the present invention 120 which handles date computations. The date computation is performed by the calendaring program 120 and transferred to the display terminal 130 via the communications area and the I/O channel 125.

Figure 2:
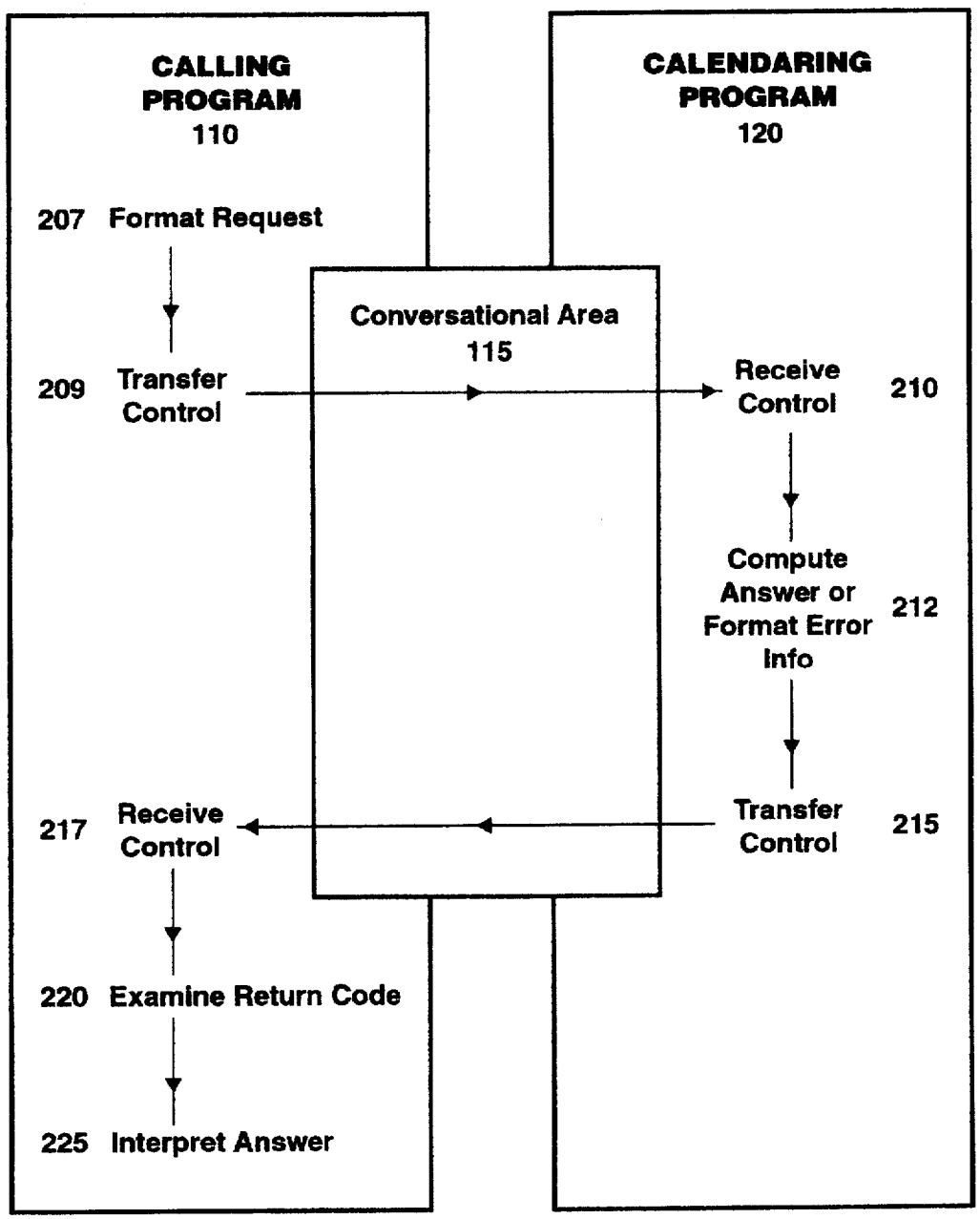
FIG. 2 is a diagram of interactions between the calling program and the calendaring program of the present invention.

FIG. 2 is view of the interface between the calling program 110 and the calendaring program 120 of FIG. 1a. The calling program 110 formats a request 207 and then transfers control 209 via the conversational area 115 to calendaring program 120 of the present invention. The method of invocation can vary. For instance, in COBOL programming language a "CALL" statement or a "LINK" statement may be used. The calendaring program 120 then receives control of the request 210 and examines the request. If the request is valid, an answer will be formatted 212 and transferred 215 via the conversational area 115 to the calling program 110. If the request is not valid, an error number and text will be formatted instead. When the calling program 110 receives control of execution it examines the return 220 for an error condition before any other operation since if the return code is bad, the other output areas have no meaning. However, if the return code is good, the calling program 110 interprets the answer 225.

There are a number of standards and conventions used within the system of the present invention which are described below:

1. The system treats Sunday as the first day of the week, and Saturday as the seventh day of the week. This corresponds to the arrangement of the days of the week on the calendar. Though the user is able to assign arbitrary numerical values to the days of the week, the first position in fields of seven characters representing days of the week will always represent Sunday, and so on.

2. The number of days that have elapsed since Jan. 01, 0001 is termed the "absolute days". The integer absolute days value 00000001 is defined equal to the date of Jan. 01, 0001, and according to the leap-year rules discussed above the absolute days value 03652056 is then equal to the date of Dec. 31, 9999.

3. The system distinguishes between a calendar day and a processing day. A calendar day is any day of the calendar year and a processing day is a business day or a work day. Processing days are defined for each day of the week, and may take holidays into account.

4. The literal "CURRDATE" may be entered into either the FROM-DATE field or the TO-DATE field (see below), and generates the current date.

5. The system maintains consistency between two basic types of functions. The first basic type of function computes the number of days between two dates. For example there are 3 days between Mar. 15, 1994 and Mar 18, 1994. The second basic type of function calculates a date based on a starting date and a numerical increment. For example, Mar. 15, 1994 plus 3 days results in Mar. 18, 1994. "FROM-DATE" specifies the starting point; "TO-DATE" specifies the ending point; "DIRECTION" specifies the bearing from the FROM-DATE to the TO-DATE; and "DISPLACEMENT" specifies the actual number of days that lie between the two dates. The principles of FROM-DATE, TO-DATE, DIRECTION and DISPLACEMENT are exemplified in the examples below:

| DAYS BETWEEN | | DATE +/- N Days | |
|---|---|---|---|
| FROM-DATE | Mar 15, 1994 | FROM-DATE | Mar 15, 1994 |
| TO-DATE | Mar 18, 1994 | DIREC/DISPL | +3 |
| DIREC/DISPL | +3 | TO-DATE | Mar 18, 1994 |
| FROM-DATE | Mar 18, 1994 | FROM-DATE | Mar 18, 1994 |
| TO-DATE | Mar 15, 1994 | DIREC/DISPL | −3 |
| DIREC/DISPL | −3 | TO-DATE | Mar 15, 1994 |

FIG. 3 is a reference list of the parameters which may be routed through the conversational area 115. The parameters include business parameters, input parameters, and output parameters. Although all parameters include the prefix "TRC-CONVR-" in the preferred embodiment, this prefix is omitted in the following discussion for ease of presentation. Each row of the business, input and output parameters sections of FIG. 3 contains a parameter name, and may also contain the term "PIC" followed by the character type and length for the parameter; the term "VALUE", followed by a preset default value for the parameter; and/or a comment. Alphanumeric characters (including standard special characters such as hyphens, commas, etc.) are represented by an "X", and numeric characters (the numerals 0 through 9) are represented by a "9". The length of the character string for the parameter is the number in parentheses following the character type. For instance, "X(02)" represents an alphanumeric character string of length two, and "9(3)" indicates a numeric character string of length three.

The business parameters are global settings that are in effect for every invocation of the system. The system administrator will assign initial values to these parameters to serve the needs of most of the company. Therefore, the user can probably leave these parameters untouched. However, if a user has any special requirements, he or she may change the value of any business parameter at any time.

The business parameter HOLIDAY-TBL specifies the holiday table that the user would like to reference. The preferred embodiment of the present invention provides ten holiday tables, though a program with more holiday tables is within the scope of the invention. The system administrator can inform users which tables contain which holidays.

The parameter FISCYR-START specifies the first month of the fiscal year, and its permitted values range from 01 through 12. The system uses this parameter when it performs a function related to the endpoints of a fiscal year or quarter. For example, FISCYR-START is used in the determination of answers to the questions "What is the beginning of the next fiscal quarter?" or "What was the end of the previous fiscal year?". If the company's fiscal year coincides with the calendar year, then this parameter is left at the default value of 01.

The parameter FISCMO-START specifies the first day of the fiscal month, and its value can range from 01 through 28. The system uses this value when it performs a function related to the endpoints of the fiscal year, quarter or month. For example, FISCMO-START is used in the determination of answers to the queries "What is the beginning of the current fiscal month?" or "What was the end of the previous fiscal quarter?". If the company's fiscal month coincides with the calendar month, then this parameter is left at the default value of 01.

The parameter END-PNTS-DEF specifies which of the date end-points the system will consider when it performs date calculations. There are four possible values for this parameter:

B=Both FROM-DATE and TO-DATE

N=Neither FROM-DATE or TO-DATE

F=FROM-DATE only

T=TO-DATE only

The use of "T" to yield "common sense" answers is highly recommended. It should be noted that this parameter is used explicitly in the series 100, series 200 (except 207), series 600, and series 700 functions. This parameter is set implicitly to "T" for the function 207, and is set implicitly to "B" for the 800 series. These series of functions are described below.

If the user uses the values "B" or "N", and specifies dates that are equal, or a direction/displacement of zero, then the user may receive an error message. This error message will say that the user has attempted a restricted operation. Consider a request to calculate the number of days between Jan. 14, 1995 and Jan. 14, 1995 with neither end point to be included. The solution to such a problem is undefined so the system restricts such operations, rather than assigning an arbitrary answer such as zero.

It is important to understand the manner in which the processing day definition and END-PNTS-DEF work together. Let us suppose that the user wants to know the number of processing days from Sep. 06, 1993 to Sep. 09, 1993. Let us further suppose that Monday, Sep. 06, 1993 is a holiday, and that the user does not want to consider it a processing day. Under these circumstances the importance of specifying whether the end points are to be included or excluded is highlighted. If the end points parameter is set to "T" then the answer is 3 since the range of dates includes 07, 08, and 09, and all of these days qualify. However, if the end points parameter is set to "F" then the answer is 2, since the range of dates includes 06, 07, and 08, but 06 does not qualify because it is not a processing day.

The parameter DOW-STRING allows the user to define the numerical values that correspond to each day of the week. In the preferred embodiment, position 1 corresponds to Sunday and position 7 corresponds to Saturday. For each day of the week any numerical value is accepted, although repeat values are not allowed. Three common standards are shown below:

The preferred embodiment 1,2,3,4,5,6,7

IBM CICS 0,1,2,3,4,5,6

ANSI (and IBM COBOL II) 7,1,2,3,4,5,6

The parameter PROC-DAY-DEF is composed of 7 fields—one for each day of the week. In the preferred embodiment, position number 1 corresponds to Sunday, and position number 7 corresponds to Saturday. For each day, the user specifies one of the values "A", "N", "E", or "I". Each value specifies a different rule regarding the inclusion or exclusion of holidays. Their meanings are as follows:

A=Always (Always a processing day)

N=Never (Never a processing day)

E=Exclude (A processing day only if not a Holiday)

I=Include (A processing day, only if a Holiday)

As an example, the value 'NEEEEEN' means the weekends and weekday holidays are not processing days.

The parameter CENTURY-BREAK allows the user to tell the system how to assign a value to the century when the supplied date does not explicitly contain the century. The parameter has the following syntax: "AA/BB; CC". The variable CC specifies a breakpoint, and the values AA and BB specifiy contiguous centuries. If the value of the year of century is less than CC then the century is assigned the value AA, and otherwise the century is assigned the value BB. For example, the value "19/20; 50" translates to: If the year is between 00 and 49, then the century is assigned the value 20, otherwise the year is between 50 and 99, and the century is assigned the value 19.

The parameter FROM-DATE-MASK allows the user to define the format of the FROM-DATE. Specification of the mask determines the arrangement of various pieces of date information, such as year, month and day. There are five date elements: "CC" for the century, "YY" for the year of century, "MM" for the Gregorian month, "DD" for the Gregorian day, and "DDD" for the Julian day. In the mask the user must specify a filler character "—", that would correspond to leading zeroes for a numeric Cobol "MOVE", or correspond to trailing spaces for an alphanumeric Cobol "MOVE", when using less than the full eight digits. There are 52 different Gregorian and Julian formats. Consider the following examples where CENTURY-BREAK has the default value 37 19/20; 50":

| MASK     | VALUE     | DATE              |
|----------|-----------|-------------------|
| —YYDDD   | —22005    | January 5, 2022   |
| YYDDD—   | 58040—    | February 9, 1958  |
| —YYMMDD  | —760410   | April 10, 1976    |
| YYMMDD—  | 490228—   | February 28, 2049 |
| CCYYMMDD | 19930605  | June 05, 1993     |
| DDCCYYMM | 05199306  | June 05, 1993     |

The parameters TO-DATE-MASK, OUT1-DATE-MASK, OUT2-DATE-MASK, and OUT3-DATE-MASK define the formats of TO-DATE, OUT1-DATE, OUT2-DATE, and OUT3-DATE, respectively. Their use is completely analogous to that of FROM-DATE-MASK described above.

The input parameters shown in FIG. 3 under the heading INPUT-PARAMETERS are parameters that a user passes to the system. The four-digit parameter FUNCTION-CODE specifies the task that the user wants the system to perform. This parameter contains two components, FUNCTION-TYPE and FUNCTION-NUMBER. FUNCTION-TYPE is specified by a one character code where "U" signifies a utility function, "C" signifies a calendar day function, and "P" signifies a processing day function. The FUNCTION-NUMBER is specified by a three-digit numerical value. Particular functions are described in detail below.

The parameter FROM-DATE serves two purposes. If a function requires only one date, then that date goes into a FROM-DATE field. If a function requires both a FROM-DATE and a TO-DATE, then obviously, the "from date" goes into the FROM-DATE field. The format of the FROM-DATE is defined by the FROM-DATE-MASK as discussed above. If the user enters the literal "CURRDATE" into the FROM-DATE field, then the current date will be substituted into the FROM-DATE field. This is termed an "implicit" use of the current date. The current date may be determined by reading the system clock, a file containing the current date, or an entry in a relational database.

The FROM-DATE is actually stored in two storage registers, FROM-DATE-9 and FROM-DATE-X. FROM-DATE-9 contains the FROM-DATE in a numeric field of eight characters, and FROM-DATE-X contains the FROM-DATE in an alphanumeric field of eight characters. When the FROM-DATE is initialized in either one of the registers, the system of the present invention automatically initializes the other register as well. Storing the FROM-DATE in these two formats provides additional flexibility and transportability to the system.

The parameter TO-DATE specifies the TO-DATE for functions that require such a date. The format of the TO-DATE is defined by the TO-DATE-MASK and the value of the parameter is stored in a storage register. Again, if the user enters the literal "CURRDATE" into the TO-DATE field, then the current date will be substituted into the field. Again, this is termed an "implicit" use of the current date.

The parameter IN-NUMERIC-PARM specifies a DIRECTION and DISPLACEMENT in number of days. The DIRECTION is specified by a leading sign character, S, and the displacement is specified by the subsequent eight digits. The sign is separate from the direction, rather than encoded into the direction, thereby allowing IN-NUMERIC-PARM to be transported to other programs and computers. If a user wants to know the date that is 4 days later than Mar 15, 1997, then he or she would put a value of +4 into IN-NUMERIC-PARM. If the user wants to know the date that is 6 days before Mar. 15, 1997, then he or she would put a value of −6 into IN-NUMERIC-PARM. For function 207 (see below), the value of IN-NUMERIC-PARM must be nonzero. For odd functions in the range 801 through 836 (see below), the value of IN-NUMERIC-PARM must be greater than zero, while for even functions in the range 801 through 836 (see below), the value of IN-NUMERIC-PARM must be less than zero.

The parameter IN-ALPHA-PARM specifies the days of the week that the user wants to consider when working with function 207 (see below) and the functions 801–836 (see below). The parameter has seven fields corresponding in order to the days of the week Sunday through Saturday. The user specifies "Y" for "yes" or "N" for "no", for each day of the week to instruct the system which days of the week to include in its calculations.

The output parameters contain values that the user receives from the system. The output parameters include return codes, date data, and numeric data.

The output parameter RETURN-CODE contains information regarding the completion of the task. It contains a three-digit return number, RETURN-NUM, and an eighty-character return text, RETURN-TEXT. RETURN-NUM specifies whether the return is a good return (000) or a bad return (001–999). The calling program 110 interfaced to the calendaring program of the present invention 120 should test the value of the return number every time the system is invoked. If the return number specifies a bad return, then the other output areas have no meaning.

The 80 character RETURN-TEXT elaborates on the meaning of the value of RETURN-NUM. If RETURN-NUM has a value of is 000, then RETURN-TEXT will say "GOOD RETURN." However, if the RETURN-NUM is 001–999, then the RETURN-TEXT will contain a descriptive message.

If the function that the user has specified results in the calculation of a date, then that date will be found in four different date fields. The first of the output date fields is STDOUT-DATE. It is an eight character field representing the system standard format of "CCYYMMDD". STDOUT-DATE is provided for the user automatically. The parameters OUT1-DATE, OUT2-DATE and OUT3-DATE are the second, third and fourth output date areas. Their formats are specified by OUT1-DATE-MASK, OUT2-DATE-MASK and OUT3-DATE-MASK, as discussed above.

The parameter OUT-NUMERIC-PARM serves two purposes. Most of the time, OUT-NUMERIC-PARM specifies the answer to such questions as "How many calendar days are there from Aug. 15, 1997 to August 23, 1997?" or "How many calendar days are there from Sep. 19, 1994 to Sep. 13, 1994?" In the first example the answer is +8 and in the second example the answer is −6. For inquiries of this type, the answer always specifies an eight-digit displacement and a direction by providing a plus or minus sign before an integer. In other cases OUT-NUMERIC-PARM denotes answers to specific questions posed by utility functions U002 through U007, as listed in the below:

| FUNC | TASK | OUT-NUMERIC-PARM |
|------|------|------------------|
| U002 | Valid Date? | 0-NO; 1-YES |
| U003 | Leap Year? | 0-NO; 1-YES |
| U004 | Holiday? | 0-NO; 1-YES |
| 005 | Processing Day? | 0-NO; 1-YES |
| U006 | Day of Week | See DOW-STRING |
| U007 | Absolute Days | 00000001-03652056 |

The system provides the user with four classes of functions: utility functions, basic functions, extended functions, and advanced functions. Any date calculation utilizing these functions is based on day counting according to the flow charts shown in FIGS. 5c and 5d, and a leap-year determination method according to the flow chart shown in FIG. 4a.

Figure 4A:
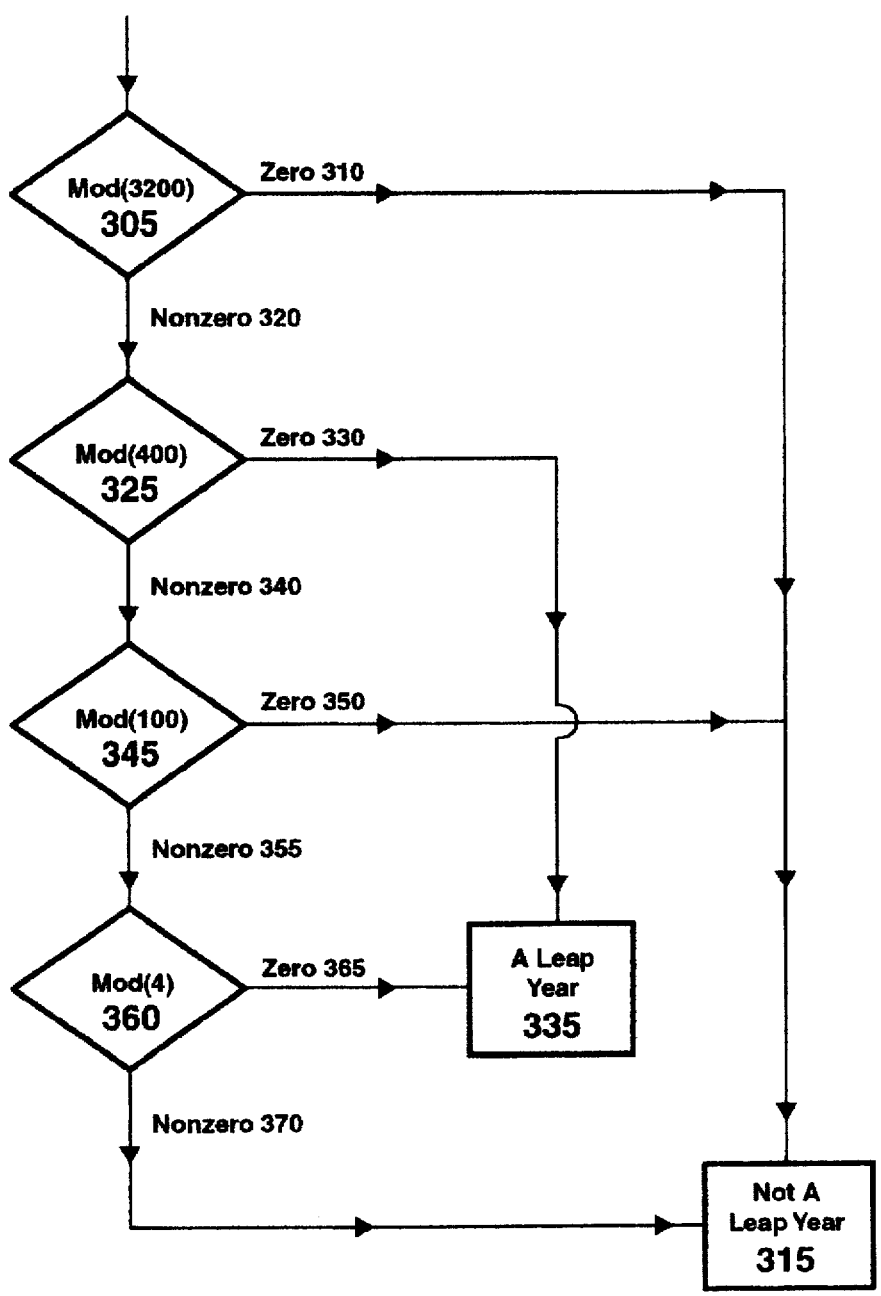
FIG. 4a is a flow chart for the method for determination of leap years according to the present invention.

As shown in FIG. 4a, the leap year status of a year is determined by first calculating in Mod(3200) unit 305 the remainder when the year is divided by 3200. If the remainder is zero 310 it is then concluded that the year is not a leap year 315 and this status is stored in a leap year status register (not shown). Otherwise, the nonzero remainder 320 is passed to a Mod(400) unit 325 where the remainder of the output of the Mod(3200) unit 305 when divided by 400 is determined. If the remainder is zero 330 it is then concluded that the year is a leap year 335, and this status is stored in the leap year status register. Otherwise 340, the nonzero remainder is passed to Mod(100) unit 345 where its remainder when divided by 100 is determined. If the remainder is zero 350 then it is concluded that the year is not a leap year 315, and this status is stored in the leap year status register. Otherwise 355, the nonzero remainder is passed to the Mod(4) unit 360 where its remainder when divided by 4 is determined. If the remainder is zero 365 it is concluded that the year is a leap year 335, and this status is stored in the leap year status register. Otherwise 370, there is a nonzero remainder, it is concluded that the year is not a leap year 315, and this status is stored in the leap year status register.

It should be noted that the system described by the flow chart of FIG. 4a may be extended by the inclusion of other division units above the Mod(3200) unit 305 to generate a higher degree of accuracy. Alternatively, reduced accuracy may be produced by excluding the Mod(3200) unit 305, or the Mod(3200) unit 305 and the Mod(400) unit 325, etc.

Figure 4B:
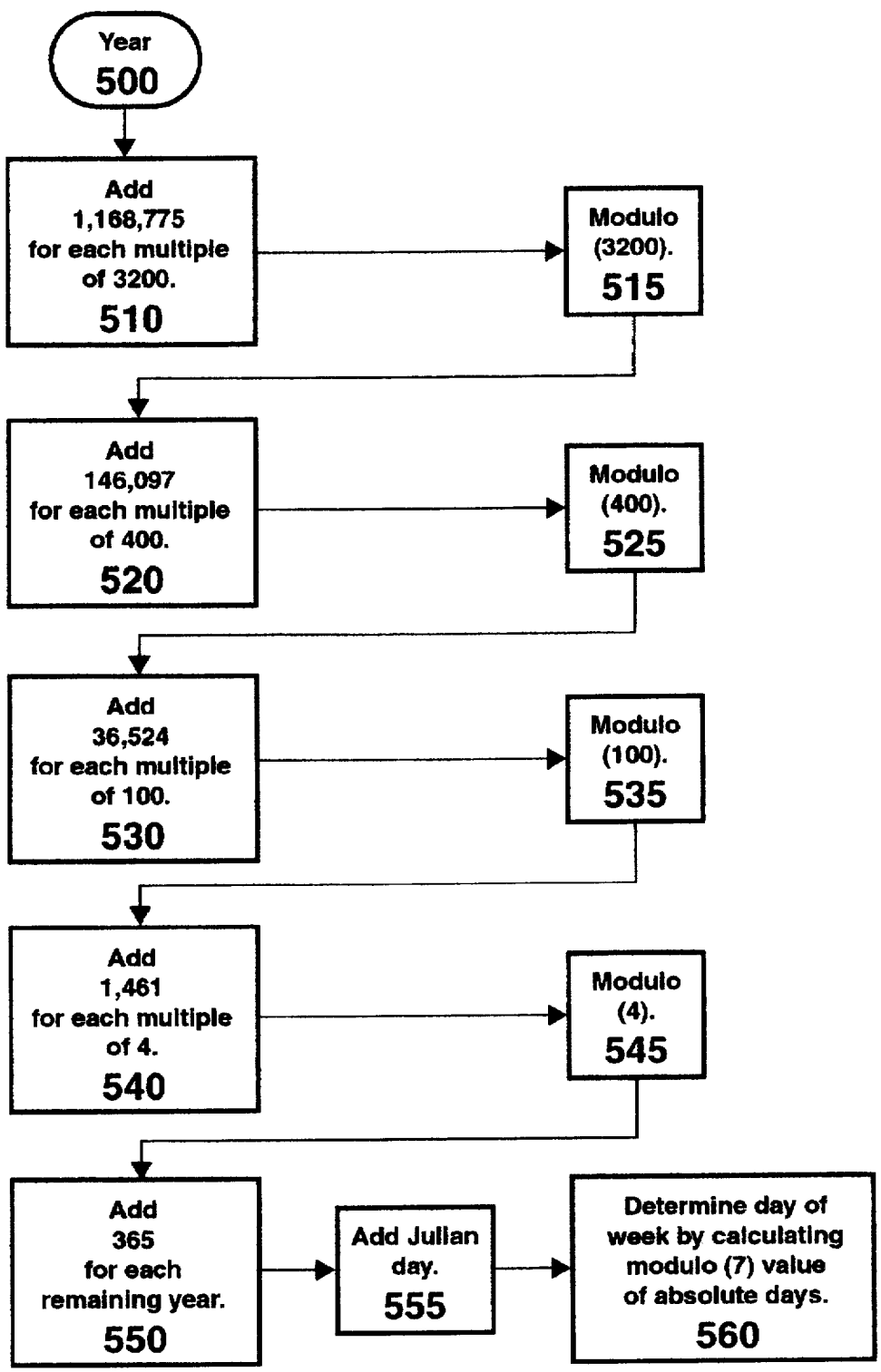

To calculate the absolute days corresponding to a given date, the leap year rules described above and depicted in FIG. 4a are applied as shown in the flow chart of FIG. 4b. In calculating the absolute days corresponding to a date located in a year and having a Julian day value, the days in all the years prior to the year in which the date lies must be totaled, and then the Julian day value of the present year is added. Therefore the year 500 referred to in FIG. 4b is the year prior to the year containing the date. The absolute days is determined by first passing the year value 500 to a unit 510 which adds 1,168,775 to an absolute days register (not shown) for each multiple of 3200 in the year 500. Then, the value of the year 500 modulo(3200) is calculated 515, and passed to a unit 520 which adds 146,097 to the absolute days register for each multiple of 400 in the value produced by the modulo(3200) unit 515. The value generated by the modulo (3200) unit 515 is then passed to a unit 525 which calculates the modulo(400) value and passes this value to a unit 530 which adds 36,524 to the absolute days register for each multiple of 100 in this value. The value generated by the modulo(400) unit 525 is then passed to a unit 535 which calculates the modulo(100) value, and passes this value to a unit 540 which adds 1461 to the absolute days register for each multiple of 4 is the value generated by the modulo(100) unit 535. The value generated by the modulo(100) unit 535 is then passed to a modulo(4) unit 545. The value of the year 500 modulo(4) is passed to a unit 550 which adds 365 to the absolute days register for each year left, and in a final unit 555 the Julian day of the date is added to the absolute days register. For example, consider the date Jan. 15, 1993. Since 1993−1=(4×400)+(3×100)+(23×4), the absolute days corresponding to Jan. 15, 1993 is (4×146,097)+(3×36,524)+(23× 1461)+15=727,578. The day of week of a given date is then determined by passing the absolute days value to a unit 560 which calculates the absolute days value modulo(7). For instance, the day of week of Jan. 15, 1993 is Friday since the modulo(7) value of 727,578 is 5 and Jan. 1, 0001 was a Monday.

The system of the present invention permits the calling program 110 to reference ten different holiday tables. However, it should be understood that the present invention is not limited to having ten holiday tables, and a greater or lesser number of holiday tables is considered within the scope of the present invention. The system administrator defines all ten holiday tables, possibly under the advisement of a business analyst associated with the shop. Some or all of the holiday tables may be empty. Possible holiday tables may be based on federal holidays, state holidays, bank holidays, stock market holidays (domestic and/or foreign), or holidays of foreign countries.

Figure 5A:
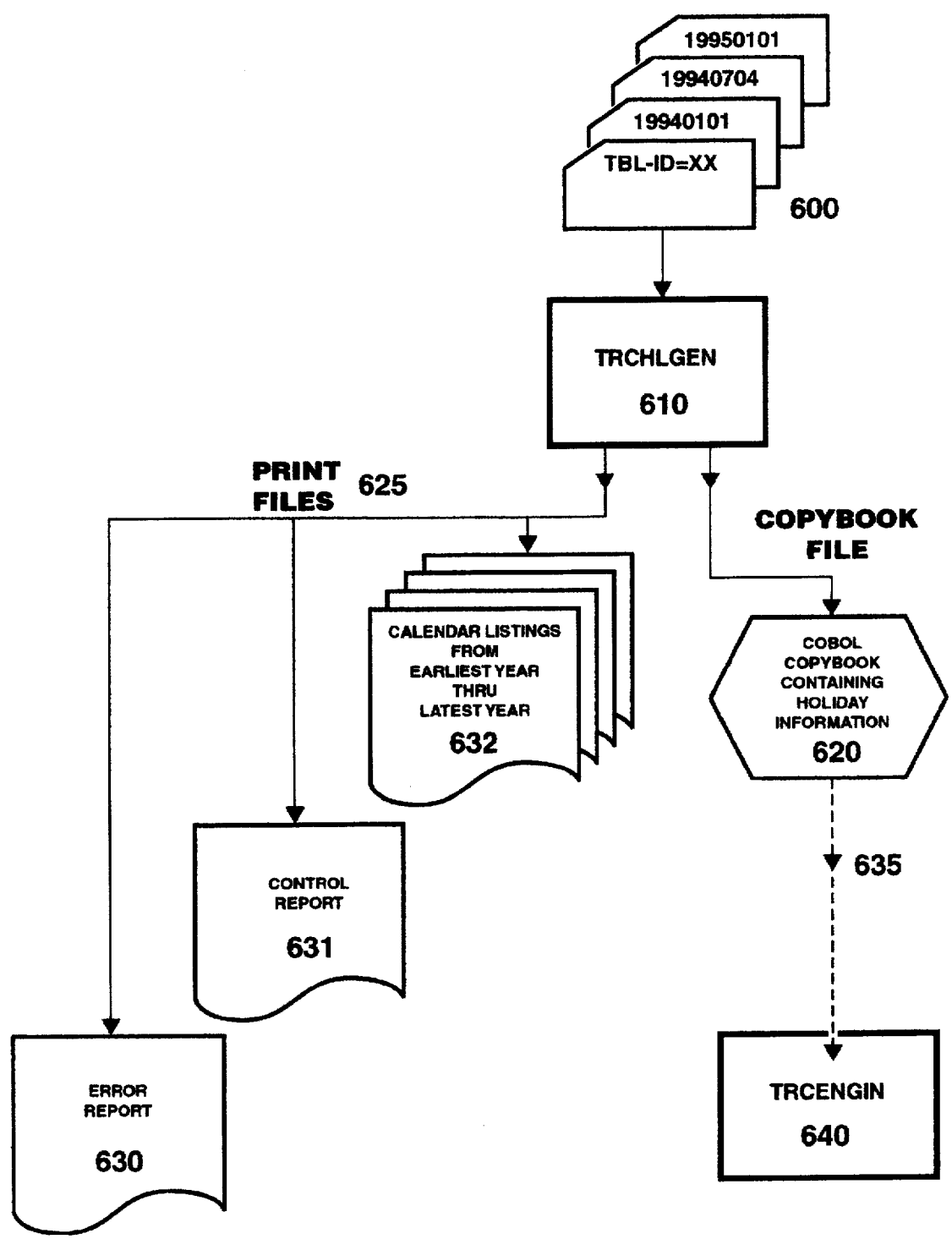
FIG. 5a is a diagram illustrating entry of holiday tables to the system of the present invention.

FIG. 5a shows the process required to define a holiday table. To creating tables containing holidays is a two-pass operation through a holiday table generator TRCHLGEN 610. First, the system administrator enters two dates 600: January 1 of the earliest year and December 31 of the latest year for which the holiday listings are to be created.

The preprocessing program TRCHLGEN 610 creates three print files 625, namely an error report 630, a control report 631 and a calendar listing 632, to provide the system administrator with hard-copy results. (If TRCHLGEN 610 does not execute successfully at this point, then the job control language may have to be modified to tailor it to the host.) The error report 630, the control report 631, and the calendar listings 632 each contain 80 characters per line, to facilitate viewing from the remote terminal or monitor 130. These files may be stored for future reference. The error report 630 informs the system administrator of errors such as the entry of duplicate dates. The control report 631 informs the system administrator of the final status and statistics, i.e. the total number entries (in this case two) and the number of good and bad entries. The calendar listings 632 is provided if there were no errors in the input of the holiday information 600. The calendar listings 632 contains dates ranging from the earlier date to the later date. TRCHLGEN also creates a COBOL copybook 620 that contains the holiday information; in this case the two input dates are marked as holidays.

The calendar listings 632 are then used as a hardcopy "turnaround" document to identify and mark all of the holidays of interest for a second pass through TRCHLGEN 610. The holiday table information 600 is input to the system by first inputting a holiday table number with the format "TBL-ID=xx", where xx is a number in the range 01 through 10. This is followed by a sequence of "card-like" images, each containing one holiday date in columns 1–8 in the CCYYMMDD format. A card-like image with an asterisk in column one, will be treated as a comment.

Preprocessing program TRCHLGEN 610 checks each holiday date for errors and sorts all the holidays in each table in chronological order to detect duplicates. TRCHLGEN 610 creates a COBOL copybook 620 that contains the holiday information. The name of the copybook 620 is TRCHLTxx, where xx is a number in the range 01 through 10. The preprocessing program TRCHLGEN 610 again creates the three print files 625, namely an error report 630, a control report 631 and a calendar listing 632, to provide the system administrator with hard-copy results. The error report 630 informs the system administrator of errors such as the entry of duplicate holidays. The control report 631 informs the system administrator of the final status and statistics, i.e. the total number entries and the number of good and bad entries, of the program. The calendar listings 632 is provided if there were no errors in the input of the holiday information 600.

The copybook file 620 contains detailed and summary information relating to the holidays specified by the system administrator. The holidays of the copybook 620 may be transferred for storage 635 to the main component TRCENGIN 640 of the calendaring program 120 in ascending sequence in the absolute days format, possibly with the use of a COPY statement or an INCLUDE statement. Alternatively, the holidays may be held in a file or an ancillary subprogram which may be accessed 635 by the main component TRCENGIN 640. Precalculation of the absolute dates provides maximum efficiency during the execution of TRCENGIN 640.

As shown in the table of FIG. 5b, if TRCHLGEN 610 executes successfully and the input 600 is good, then there will not be an error report 630 because there were no errors. A control report 631 with a message saying "GOOD INPUT; CALENDARS-YES, COPYBOOK-YES," and a calendar listing that ranges from January 1st of the earliest year through December 31st of the latest year with all chosen holidays marked, will be generated. Furthermore, the copybook 620 will contain all of the holiday information required by TRCENGIN 640.

However, if the input 600 is bad, then calendar listings 632 and a copybook 620 will not be generated, as is shown in the table of FIG. 5b. The control report will have a message saying "BAD INPUT; CALENDARS-NO, COPYBOOK-NO," and the error report 630 will be a detailed report showing all of the errors that were detected.

If all ten holiday tables are not needed, then empty tables must be created so that the total number of holiday tables is ten. To create an empty table, the program TRCHLGEN 610 is executed with only the TBL-ID=xx card 600 as input. As shown in the table of FIG. 5b, there will then be no error report 630 because there was no holiday input, the control report 631 will have a message saying "NO INPUT; CALENDARS-NO, COPYBOOK-YES," and the copybook 620 will have an empty holiday table.

All calendar-day calculations of a number of days between two dates are calculated by subtraction of absolute day values. If an END-PNTS-DEF of "T" or "F" is specified the number of days is simply equal to the difference between the absolute days values. However, if an END-PNTS-DEF of "N" is specified the absolute value of the difference is decreased by unity, and if an END-PNTS-DEF of "B" is specified the absolute value of the difference is increased by unity.

Figure 5C:
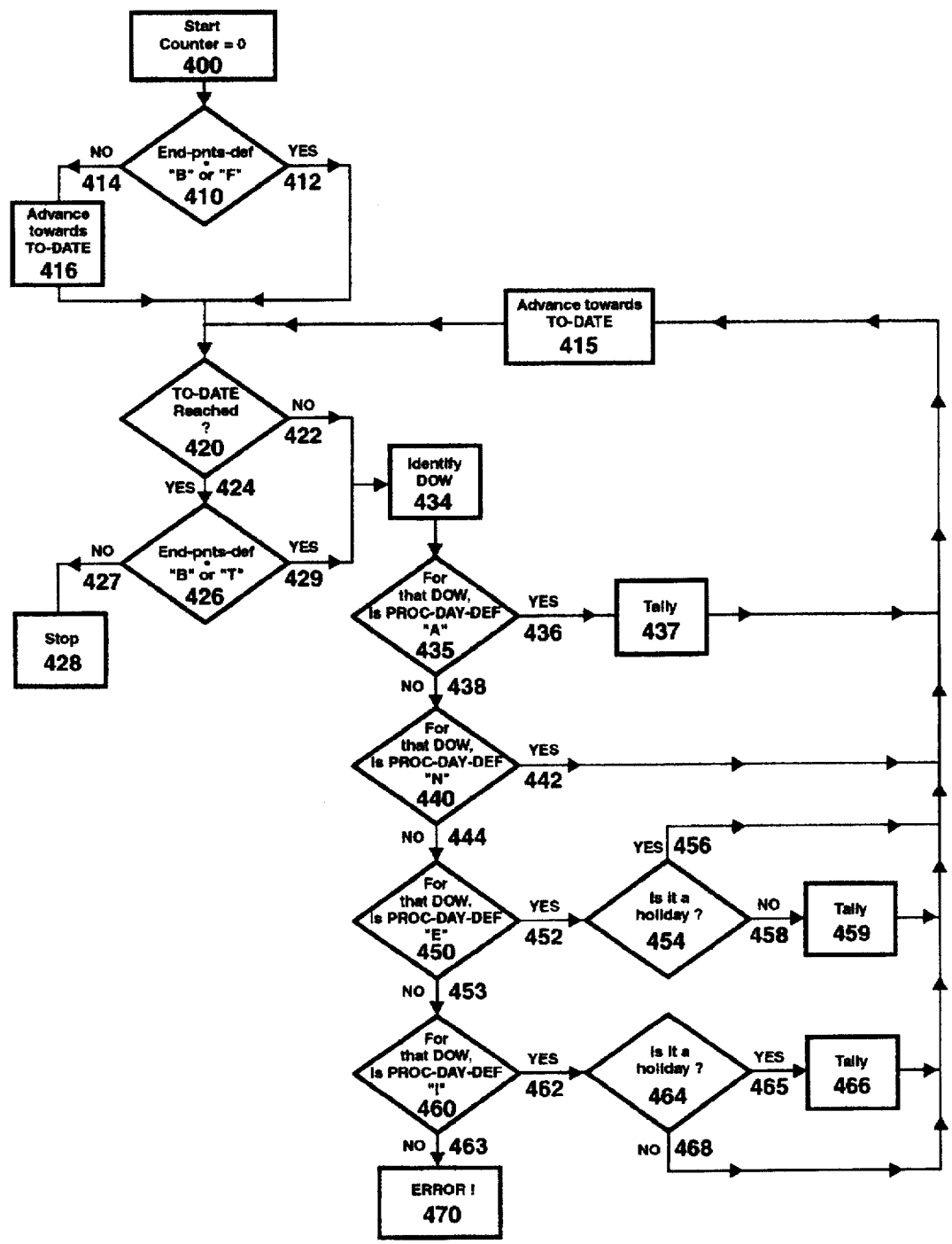
FIG. 5c is a flow chart for a method of counting days between a FROM-DATE and a TO-DATE, incorporating features such as changeable endpoints and processing day definitions, according to the present invention.

All processing-day calculations of a number of days between two dates are based on the day counting method shown in the flow chart of FIG. 5c. As shown in FIG. 5c, initially 400 a day counter register is set to a value of zero and the FROM-DATE is initialized according to the value provided by the date calculation call. Then a decision module 410 determines whether the value of END-PNTS-DEF is a "B" or an "F". If the answer is "NO" 414 the FROM-DATE is advanced towards the TO-DATE 416 since the initial FROM-DATE is not to be counted as an endpoint. Otherwise 412, the value of END-PNTS-DEF is "B" or "F" and the FROM-DATE is to be counted as an endpoint.

Then a decision module 420 tests whether the TO-DATE has been reached. If the answer is "YES" 422 then the process flow is directed to a decision module 426 which tests whether the value of END-PNTS-DEF is a "B" or a "T". If the answer is "NO" 427 END-PNTS-DEF does not have a value of "B" or "T", then the computation is complete and the day counter register holds the desired answer.

If the answer is "YES" 429 END-PNTS-DEF has a value of "B" or "T", or "NO" 422 the TO-DATE has not been reached, then the process flow is directed to a module 434 where the day of week (DOW) for the present FROM-DATE is identified. Decision module 435 then tests whether the PROC-DAY-DEF for that DOW has the value "A". If so 436 then the number in the day counter register is incremented by the tally routine 437 and the FROM-DATE is advanced towards the TO-DATE at the Advance Towards TO-DATE module 415.

If the PROC-DAY-DEF for that DOW is not "A" 438 then the process flow is directed to a decision module 440 which determines if the PROC-DAY-DEF for that DOW is an "N". If the answer is "YES" 442 then the FROM-DATE is advanced towards the TO-DATE at the Advance Towards TO-DATE module 415. If the answer is "NO" 444 then the process flow is directed to another decision module 450 which determines if the PROC-DAY-DEF for that DOW is an "E". If the answer is "YES" 452 then another decision module 454 determines if the FROM-DATE is a holiday by consulting the invoked holiday table. If the answer is "YES" 456 then the FROM-DATE is advanced towards the TO-DATE at the Advance towards TO-DATE module 415. However, if the answer is "NO" 458 then a tally routine 459 increments the day counter before advancing the FROM-DATE.

If it is determined that the PROC-DAY-DEF is not "E" 453 then the process flow is directed to another decision module 460 which determines if the PROC-DAY-DEF for that DOW is an "T". If the answer is "YES" 462 then a decision module 464 determines if the FROM-DATE is a holiday by consulting the holiday table. If the answer is "NO" 468 then the FROM-DATE is advanced towards the TO-DATE at the Advance Towards TO-DATE module 415. However, if the answer is "YES" 465 then a tally routine 466 increments the day counter before advancing the FROM-DATE at the Advance Towards TO-DATE module 415. If it is determined at decision module 460 that the PROC-DAY-DEF for that DOW is not "T" 463 then an error message is generated 470, since every DOW must be assigned one of the values "A", "N", 'E", or "T" and according to the path of the process flow the DOW does not have one of these values.

After the FROM-DATE is advanced towards the TO-DATE at the Advance Towards TO-DATE module 415 the process flow is directed back to the decision module 420 that determines if the TO-DATE has been reached, and the process continues as before. The process terminates only when the stop 428 is reached.

All calendar-day calculations of a TO-DATE a target number of days from a FROM-DATE are determined by addition or subtraction of absolute day values. The absolute value of the target number is termed the "displacement" and the sign of the target number is termed the "direction". If the direction is positive the displacement is added to the absolute days value of the TO-DATE, and if the direction is negative the displacement is subtracted from the absolute days value of the TO-DATE. If the END-PNTS-DEF is "N" the TO-DATE is incremented by unity in the direction of the target number, and if the END-PNTS-DEF is "B" the TO-DATE is incremented by unity in the opposite direction of the target number.

Figure 5D:
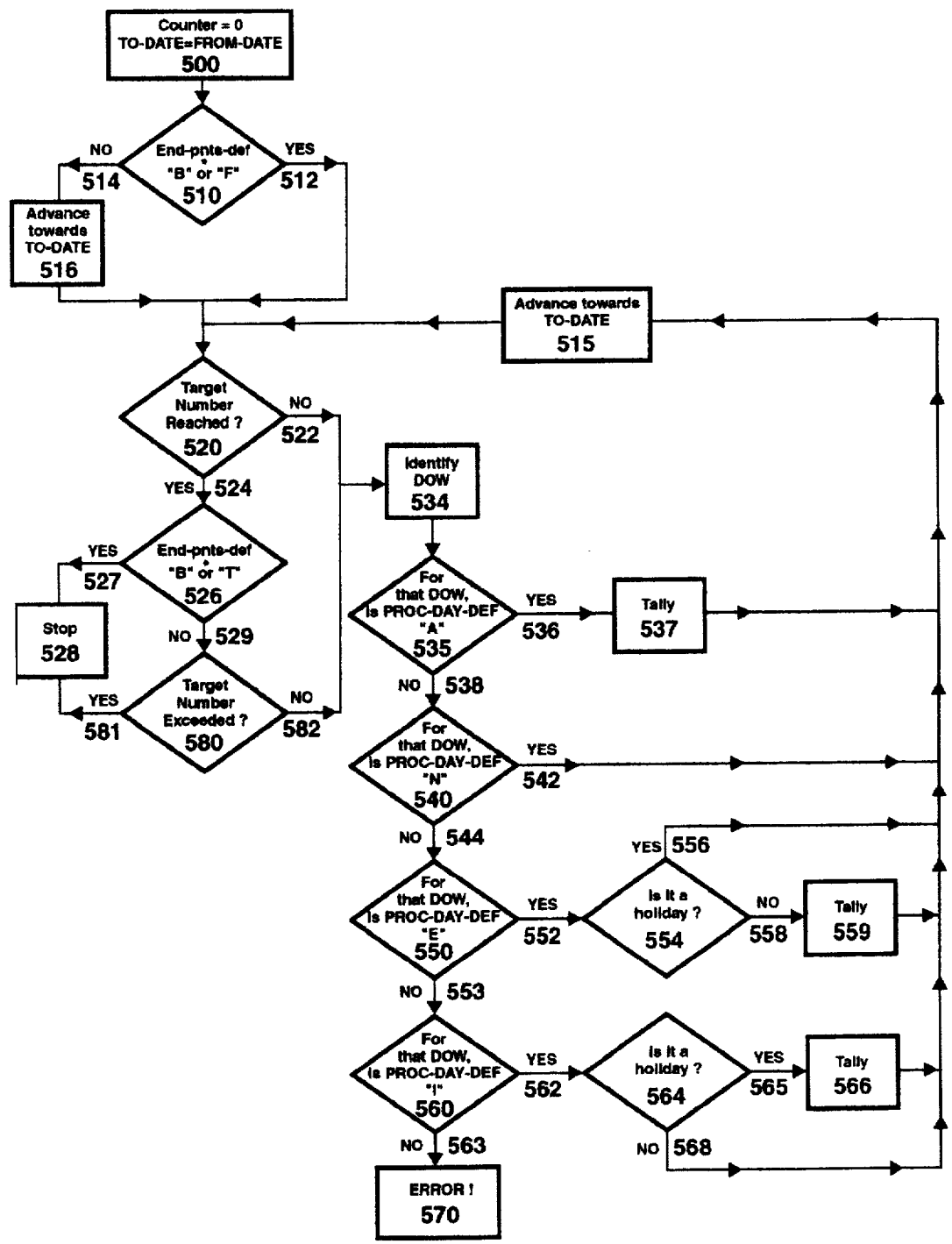
FIG. 5d is a flow chart for a method of determining a TO-DATE a specified number of days from a FROM-DATE, incorporating features such as changeable endpoints and processing day definitions, according to the present invention.

All processing-day calculations of a TO-DATE a target number of days from a FROM-DATE are based on the day counting method shown in the flow chart of FIG. 5d. As shown in FIG. 5d, initially 500 a day counter register is set to a value of zero and the TO-DATE is initialized to the value of the FROM-DATE. Then a decision module 510 determines whether the value of END-PNTS-DEF is a "B" or an "F". If the answer is "NO" 514 the TO-DATE is advanced since the initial FROM-DATE is not to be counted as an endpoint. Otherwise, the answer is "YES" 512 the value of END-PNTS-DEF is "B" or "F", and the FROM-DATE is to be counted as an endpoint, and the flow proceeds to a decision module 520.

Then a decision module 520 tests whether the target number stored in a target number register (not shown) has been reached by the counter number stored in the counter number register. If the answer is "NO" 522 then the process flow is directed to a module 534 which identifies the day of week (DOW) of the FROM-DATE. However, if the answer is "YES" 524 the target number has been reached then a decision module 526 tests whether the value of END-PNTS-DEF is a "B" or a "T". If the answer is "YES" 527 then the process flow stops 528, the computation is complete, and the TO-DATE register holds the desired answer.

If the answer is "NO" 529 the END-PNTS-DEF does not has a value of "B" or "T", then the process flow is directed to a decision module 580 which determines whether the target number has been exceeded. If the answer is "YES" 581 the target number has been exceeded, then the process ends 528 and the desired answer is stored in the TO-DATE register. Otherwise, the answer is "NO" 582 the target number has not been exceeded, and the process flow is directed to the module 534 which identifies of DOW of the FROM-DATE by the method discussed above and depicted in the flow-chart of FIG. 4b. Decision module 535 then tests whether the PROC-DAY-DEF for that DOW has the value "A". If the answer is "YES" 536 then the number in the day counter register is incremented by the tally routine 537 and the TO-DATE is advanced at the Advance Towards TO-DATE module 515.

If the PROC-DAY-DEF for that DOW is not "A" 538 then the process flow is directed to a decision module 540 which determines if the PROC-DAY-DEF for that DOW is an "N". If the answer is "YES" 542 then the TO-DATE is advanced at the Advance TO-DATE module 15. If the answer is "NO" 544 then the process flow is directed to another decision module 550 which determines if the PROC-DAY-DEF for that DOW is an "E". If the answer is "YES" 552 then another decision module 554 determines if the TO-DATE is a holiday by consulting the invoked holiday table. If the answer is "YES" 556 then the TO-DATE is advanced at the Advance TO-DATE module 515. However, if the answer is "NO" 558 then a tally routine 559 increments the day counter before advancing the TO-DATE.

If it is determined that the PROC-DAY-DEF is not "E" 553 then the process flow is directed to another decision module 560 which determines if the PROC-DAY-DEF for that DOW is an "T". If the answer is "YES" 562 then a decision module 564 determines if the TO-DATE is a holiday by consulting the holiday table. If the answer is "NO" 568 then the TO-DATE is advanced at the Advance TO-DATE module 515. However, if the answer is "YES" 565 then a tally routine 566 increments the day counter before advancing the TO-DATE at the Advance TO-DATE module 515. If it is determined at decision module 560 that the PROC-DAY-DEF for that DOW is not "T" 563 then an error message is generated 570, since every DOW must be assigned one of the values "A", "N", "E", or "T" and according to the path of the process flow the DOW does not have one of these values.

After the TO-DATE is advanced at the Advance TO-DATE module 515 the process flow is directed back to the decision module 520 that determines if the target number has been reached by the counter number, and the process continues as before. The process terminates only when the stop 528 is reached.

There are nine different utility functions, each specified by a one-character FUNCTION-TYPE, followed by a three digit FUNCTION-NUMBER. The FUNCTION-TYPE for all utility functions is the letter "U". The FUNCTION-NUMBER for utility functions ranges between 001 and 009. Below is a list of the utility function numbers and the corresponding names of the functions:

001 CURRENT DATE
002 VALID DATE?
003 LEAP YEAR?
004 HOLIDAY?
005 PROCESSING DAY?
006 IDENTIFY DAY OF WEEK
007 DATE CONVERSION TO ABSOLUTE DAYS
008 ABSOLUTE DAYS CONVERSION TO DATE
009 REFORMAT DATE

The CURRENT DATE function (U001) provides the current date. Let us assume that the current date is May 17, 1993. If, as shown in example 1 of FIG. 6, the OUT1-DATE-MASK specifies the mask CCYYMMDD, and the FUNCTION-CODE, U001, requests the current date. After the call the current date is placed in OUT1-DATE in the format specified by the mask. This is termed an "explicit" use of the current date. The current date may be determined by reading the system clock, a file containing the current date, or an entry in a relational database.

Example 2 of FIG. 6 is the same as Example 1, except that in Example 2 the OUT1-DATE-MASK specifies the mask CCYYDDMM, rather than CCYYMMDD. Therefore, in Example 2 the same date, May 17, 1993, is shown in a different format.

The function VALIDATE DATE, U002, determines whether a specified date is valid. Invalid dates include dates with nonnumeric characters and numbers which do not correspond to a date. If the date is valid, then the value returned in OUT-NUMERIC-PARM is 1, otherwise the value is 0. As shown in Example 1 of FIG. 7, FROM-DATE-MASK specifies the mask CCYYMMDD. The FUNCTION-CODE requests validation of the FROM-DATE, Feb. 17, 1993, provided in the CCYYMMDD format. That date is valid, so OUT-NUMERIC-PARM has a value of 1. Example 2 of FIG. 7, is the same as above, except that in this example the FROM-DATE is not valid since it contains the letter "W" and is not numeric. Therefore, OUT-NUMERIC-PARM has the value 0. Notice that the system has set the value of RETURN-NUM to 014 which has been defined to designate the error message "Bad From-Date".

The function LEAP YEAR determines if the specified date lies within a leap year. If it does, then the value returned in OUT-NUMERIC-PARM is 1, otherwise the value is 0. LEAP YEAR has a function code of U003. As shown in Example 1 of FIG. 8, a call to LEAP YEAR with the FROM-DATE-MASK of CCYYMMDD and the FROM-DATE of 20001225 (Dec. 25, 2000) returns OUT-NUMERIC-PARM with a value of 1 since the year 2000 is a leap year. In Example 2 the FROM-DATE is Dec. 25, 1995 and OUT-NUMERIC-PARM is 0 since 1995 is not a leap year.

The function HOLIDAY determines if the specified date is a holiday. If it is, then the value returned by OUT-NUMERIC-PARM is 1, otherwise the value is 0. HOLIDAY has a function code of U004. As shown in Example 1 of FIG. 9, the HOLIDAY-TBL field specifies Holiday Table 04, and the FROM-DATE-MASK specifies the format CCYYMMDD. The FUNCTION-CODE, U004, requests holiday status, and in this case the FROM-DATE is Jul. 4, 1996 (the Fourth of July) and is in Holiday Table 04, so OUT-NUMERIC-PARM is 1. Example 2 of FIG. 9 is the same as Example 1, except that the FROM-DATE, Feb. 3, 1994, happens not to be in Holiday Table 04. Therefore OUT-NUMERIC-PARM is 0.

The function PROCESSING DAY determines if the specified date is a processing day. If it is, then the value of OUT-NUMERIC-PARM is 1, otherwise the value is 0. PROCESSING DAY has a FUNCTION-CODE of U005. Example 1 of FIG. 10 shows that the HOLIDAY-TBL specifies table number 05, and the FROM-DATE-MASK specifies the format CCYYMMDD. Feb. 17, 1992 happens to be in Holiday Table 05, and is a Monday. The PROC-DAY-DEF, "AAAAAAA", indicates that each day of the week is to be considered a processing day. The FUNCTION-CODE U005 requests the processing day status of the FROM-DATE. Therefore, the system sets OUT-NUMERIC-PARM to the value 1. Example 2 of FIG. 10 is the same as above, except that the PROC-DAY-DEF, "NEEEEEN", means that Monday is specified as a processing day when it does not fall on a holiday. Therefore the system does not consider the FROM-DATE a processing day, and sets OUT-NUMERIC-PARM to the value 0.

The function DAY OF WEEK identifies the day of the week that corresponds to the specified date. The number value corresponding to the day of the week is determined by the value assigned to DOW-STRING, as discussed above. DAY OF WEEK has the function code U006. As shown in Example 1 of FIG. 11 the FROM-DATE-MASK specifies the format CCYYMMDD, and the DOW-STRING specifies the string of numerals "1234567". The FUNCTION-CODE, U006, requests the day of the week, and the FROM-DATE, Feb. 17, 1992 falls on a Monday, so the system sets OUT-NUMERIC-PARM to the value 2. Example 2 of FIG. 11 differs from Example 1 in that the DOW-STRING specifies the string "0123456". Since the FROM-DATE, May 19, 1993, is a Wednesday the system sets OUT-NUMERIC-PARM to the value 3.

The function DATE→ABSOLUTE DAYS (U007) converts the specified date into the absolute day count, i.e., the number of days since Jan. 01, 0001. As shown in Example 1 of FIG. 12, the FROM-DATE-MASK specifies CCYYMMDD, and the FUNCTION-CODE, U007, requests the absolute day count. The FROM-DATE, Jan. 01, 0001, has been defined as day 1, so the system sets OUT-NUMERIC-PARM to the value 1. In Example 2 the FROM-DATE, Jan. 1, 2005, corresponds to day 731947 so OUT-NUMERIC-PARM is set to this value.

The function ABSOLUTE DAYS→DATE (U008) converts the specified absolute day count into the corresponding calendar date. As shown in Example 1 of FIG. 13, the OUT1-DATE-MASK specifies the format CCYYMMDD, and the FUNCTION-CODE, U008, requests a conversion from absolute days to a calendar date. The IN-NUMERIC-PARM specifies day count 1, so the system sets OUT1-DATE to Jan. 01, 0001. In Example 2, the IN-NUMERIC-PARM specifies day count 731947, and the system sets OUT1-DATE to 20050101, i.e., Jan. 1, 2005.

The function REFORMAT DATE (U009) converts the specified FROM-DATE into the STDOUT, OUT1, OUT2, and OUT3 dates specified by the corresponding date masks as described above. As shown in Example 1 of FIG. 14, the system converts the FROM-DATE of 19920301 having the format CCYYMMDD specified by the FROM-DATE-MASK to the various output dates, whose formats are specified by the masks CCYYDDMM, YYMMDD-, and -CCYYDDD. Since 1992 is a leap year, as can be confirmed by use of the flowchart of FIG. 4a, March 1st corresponds to Julian day number 61 and the values of OUT1-DATE, OUT2-DATE and OUT3-DATE are therefore 19920103, 920301, and 01992061, respectively. In Example 2 the same date masks are used, but the year is 1993 rather than 1992. The year 1993 is not a leap year so March 1st corresponds to Julian day number 60 and the values of OUT1-DATE, OUT2-DATE, and OUT3-DATE are 19930103, 930301, and 01993060, respectively.

There are four "basic" functions. These basic functions perform the rudimentary calculations "DAYS BETWEEN" and "DATE±N DAYS". Each basic function is specified by a one-character FUNCTION-TYPE, followed by a three-digit FUNCTION-NUMBER. The FUNCTION-TYPE is either "C" or "P", where "C" means that the system considers all calendar days, and "P" means that the system considers only processing days. The FUNCTION-NUMBER for the basic functions is either 101 or 102, where 101 signifies "DAYS BETWEEN" and 102 signifies "DATE±N DAYS." The basic functions are also called the "100 series functions."

The function DAYS BETWEEN (C/P 101) counts the number of days from the FROM-DATE to the TO-DATE. If the FROM-DATE is earlier than the TO-DATE, the answer is positive. If the FROM-DATE is later than the TO-DATE, the answer is negative. In Example 1 of FIG. 15a, the function type "C" indicates that every calendar day qualifies. Since the parameter END-PNTS-DEF is assigned the value "T", the FROM-DATE corresponds to day count 0. According to the logic of FIG. 5c, the table below shows how the dates from the FROM-DATE of Sep. 3, 1993 to the TO-DATE of Sep. 7, 1993 are counted to provide the OUT-NUMERIC-PARM value of +4:

| DATE | QUALIFICATION | COUNT |
| --- | --- | --- |
| 19930903 | N/A | +0 |
| 19930904 | YES | +1 |
| 19930905 | YES | +2 |

-continued

| DATE | QUALIFICATION | COUNT |
|---|---|---|
| 19930906 | YES | +3 |
| 19930907 | YES | +4 |

In Example 2 of FIG. 15b the function type is "P", so only processing days are counted. The processing day definition, PROC-DAY-DEF, is "NEEEEEN" so weekends are not counted, and weekdays are counted when not holidays. Sep. 6, 1993 happens to be in Holiday Table 06, and is a Monday so the table below shows how the dates are counted to provide the OUT-NUMERIC-PARM value of +1:

| DATE | QUALIFICATION | COUNT |
|---|---|---|
| 19930903 | N/A | 0 |
| 19930904 | NO (Saturday) | 0 |
| 19930905 | NO (Sunday) | 0 |
| 19930906 | NO (Holiday) | 0 |
| 19930907 | YES | +1 |

Examples 3 and 4 of FIG. 15b, are similar to Examples 1 and 2 of FIG. 15a, except that the FROM-DATE and the TO-DATE have been reversed. The table below shows how the days are counted in Example 3 to provide the OUT-NUMERIC-PARM value of –4:

| DATE | QUALIFICATION | COUNT |
|---|---|---|
| 19930907 | N/A | 0 |
| 19930906 | YES | –1 |
| 19930905 | YES | –2 |
| 19930904 | YES | –3 |
| 19930903 | YES | –4 |

The table below shows how the days are counted in Example 4 to provide the OUT-NUMERIC-PARM value of –1:

| DATE | QUALIFICATION | COUNT |
|---|---|---|
| 19930907 | N/A | 0 |
| 19930906 | NO (Holiday) | 0 |
| 19930905 | NO (Sunday) | 0 |
| 19930904 | NO (Saturday) | 0 |
| 19930903 | YES | –1 |

The function DATE±N DAYS (C/P 102) calculates the date that is N days later or earlier, respectively, than the specified date. Example 1 of FIG. 16a shows the calculation of the date that is +4 days from the FROM-DATE of Sep. 3, 1993. According to the end point definition, END-PNTS-DEF, of 'T' the FROM-DATE corresponds to a day count of 0. Because the FUNCTION-TYPE is 'C', every day qualifies and the days are counted as shown in the table below according to the logic of FIG. 5c to provide the OUT1-DATE value of 19930907, i.e. Sep. 7, 1993:

| DATE | QUALIFICATION | COUNT |
|---|---|---|
| 19930903 | N/A | 0 |
| 19930904 | YES | +1 |
| 19930905 | YES | +2 |
| 19930906 | YES | +3 |
| 19930907 | YES | +4 |

However, in Example 2 of FIG. 16a the FUNCTION-TYPE is a 'P' and since Sep. 6, 1993 happens to be in Holiday Table 06 the days are counted as shown in the table below to provide the OUT1-DATE value of 19930910, i.e. Sep. 10, 1993:

| DATE | QUALIFICATION | COUNT |
|---|---|---|
| 19930903 | N/A | 0 |
| 19930904 | NO (Saturday) | 0 |
| 19930905 | NO (Sunday) | 0 |
| 19930906 | NO (Holiday) | 0 |
| 19930907 | YES | +1 |
| 19930908 | YES | +2 |
| 19930909 | YES | +3 |
| 19930910 | YES | +4 |

Examples 3 and 4 of FIG. 16b, are similar to Examples 1 and 2 of FIG. 16a, except that IN-NUMERIC-PARM is negative (toward the past), rather than positive (toward the future). In Example 3 the days are counted as shown below to provide the OUT1-DATE of 19930903:

| DATE | QUALIFICATION | COUNT |
|---|---|---|
| 19930907 | N/A | 0 |
| 19930906 | YES | –1 |
| 19930905 | YES | –2 |
| 19930904 | YES | –3 |
| 19930903 | YES | –4 |

In Example 4 the days are counted as shown below to provide the OUT1-DATE of 19930903:

| DATE | QUALIFICATION | COUNT |
|---|---|---|
| 19930910 | N/A | 0 |
| 19930909 | YES | –1 |
| 19930908 | YES | –2 |
| 19930907 | YES | –3 |
| 19930906 | NO (Holiday) | –3 |
| 19930905 | NO (Sunday) | –3 |
| 19930904 | NO (Saturday) | –3 |
| 19930903 | YES | –4 |

There are fourteen extended functions. They answer common questions such as "What is the next day?" or "What date is three days before the end of the month?" Each extended function is specified by a one-character FUNCTION-TYPE, followed by a three-digit FUNCTION-NUMBER. The FUNCTION-TYPE for all extended functions is either "C" or "P", where "C" means that the system considers all calendar days, and "P" means that the system considers only processing days. The FUNCTION-NUMBER for extended functions ranges from 201 to 207 so these functions are referred to as the "200 series." The FUNCTION-NUMBERS and names are listed below:

| | |
|---|---|
| 201 | NEXT DAY |
| 202 | PREVIOUS DAY |
| 203 | DAYS SINCE BEGINNING OF MONTH |
| 204 | DATE UNTIL END OF NONTH |
| 205 | BEGINNING OF MONTH +/– N DAYS |
| 206 | END OF MONTH +/– N DAYS |
| 207 | NTH DOW OCCURRENCE FORWARD/BACKWARD |

The function NEXT DAY (C/P 201) provides the date that is one day later than the date provided by the user. Example 1 of FIG. 17 shows a call to C201 to determine the calendar date that is one day later than the FROM-DATE of Feb. 12, 1993 (19930212 in the format CCYYMMDD). Since END- PNTS-DEF is assigned a value of T, the FROM-DATE corresponds to day count 0. Every day qualifies and the days are counted as shown below to provide the OUT1-DATE of Feb. 13, 1993:

| DATE | QUALIFICATION | COUNT |
|---|---|---|
| 19930212 | N/A | +0 |
| 19930213 | YES | +1 |

In Example 2 of FIG. 17 the FUNCTION-TYPE is "P" so only processing days are counted. It happens that Sep. 6, 1993 is in holiday table 07 and the days are counted as shown below to provide the OUT1-DATE of Feb. 16, 1993:

| DATE | QUALIFICATION | COUNT |
|---|---|---|
| 19930212 | N/A | 0 |
| 19930213 | NO (Saturday) | 0 |
| 19930214 | NO (Sunday) | 0 |
| 19930215 | NO (Holiday) | 0 |
| 19930216 | YES | +1 |

The function PREVIOUS DAY (C/P 202) finds the date that is one day earlier than the date provided by the user. Example 1 of FIG. 18 shows a call to C202 to find the calendar date that is one day earlier than Feb. 16, 1993 (19930216 in the format CCYYMMDD). According to the value of T assigned to END-PNTS-DEF, the FROM-DATE corresponds to a day count of 0. In Example 1, every day qualifies and the days are counted as shown in the table below to provide the OUT1-DATE of Feb. 15, 1993:

| DATE | QUALIFICATION | COUNT |
|---|---|---|
| 19930216 | N/A | –0 |
| 19930215 | YES | –1 |

Since Feb. 15, 1993 happens to be in holiday table 07, the call to P202 in Example 2 is counted as shown below to provide the OUT1-DATE of Feb. 12, 1993:

| DATE | QUALIFICATION | COUNT |
|---|---|---|
| 19930216 | N/A | 0 |
| 19930215 | NO (Holiday) | 0 |
| 19930214 | NO (Sunday) | 0 |
| 19930213 | NO (Saturday) | 0 |
| 19930212 | YES | –1 |

The function DAYS SINCE THE BEGINNING OF THE MONTH (C/P 203) provides the number of days from the date specified by the user to the beginning of the month. Example 1 in FIG. 19 shows the calculation of the number of days from Jul. 06, 1994 (19940706 in the format CCYYMMDD) back to the beginning of the month. According to the value of "T" assigned to END-PNTS-DEF, the FROM-DATE corresponds to a day count of zero. Because the FUNCTION-TYPE is "C", every day qualifies and the days are counted as shown in the table below according to the logic of FIG. 5c to provide an OUT-NUMERIC-PARM value of –5:

| DATE | QUALIFICATION | COUNT |
|---|---|---|
| 19940706 | N/A | –0 |
| 19940705 | YES | –1 |
| 19940704 | YES | –2 |
| 19940703 | YES | –3 |
| 19940702 | YES | –4 |
| 19940701 | YES | –5 |

In Example 2 of FIG. 19 the FUNCTION-TYPE is "P" so only processing days are counted. The processing days definition 'NEEEEEN' means that Saturdays and Sundays are never processing days and weekdays are processing days only when not holidays. It happens that Jul. 4, 1994 is in holiday table 05 and the days are counted as shown in the table below to provide an OUT-NUMERIC-PARM value of –2:

| DATE | QUALIFICATION | COUNT |
|---|---|---|
| 19940706 | N/A | 0 |
| 19940705 | YES | –1 |
| 19940704 | NO (Holiday) | –1 |
| 19940703 | NO (Sunday) | –1 |
| 19940702 | NO (Saturday) | –1 |
| 19940701 | YES | –2 |

The function DAYS UNTIL THE END OF THE MONTH (C/P 204) provides the number of days from the date specified by the user to the end of the month containing that date. Example 1 of FIG. 20 shows a call to this function for the calculation of the number of days from Dec. 23, 1992 (19921223 in the format CCYYMMDD) forward to the end of the month. According to the value of "T" assigned to END-PNTS-DEF, the FROM-DATE corresponds to a day count of zero.

In Example 1 every day qualifies since the FUNCTION-TYPE is "C", and the days are counted as shown in the table below to provide the OUT-NUMERIC-PARM value of +8:

| DATE | QUALIFICATION | COUNT |
|---|---|---|
| 19921223 | N/A | +0 |
| 19921224 | YES | +1 |
| 19921225 | YES | +2 |
| 19921226 | YES | +3 |
| 19921227 | YES | +4 |
| 19921228 | YES | +5 |
| 19921229 | YES | +6 |
| 19921230 | YES | +7 |
| 19921231 | YES | +8 |

In Example 2 of FIG. 20 the FUNCTION-TYPE is "P" so only processing days are counted. It happens that Dec. 25, 1993, Christmas Day, is in holiday table 08 so the days are counted as shown in the table below to provide the OUT-NUMERIC-PARM value of +5:

| DATE | QUALIFICATION | COUNT |
|---|---|---|
| 19921223 | N/A | 0 |
| 19921224 | YES | +1 |
| 19921225 | NO, (Holiday) | +1 |
| 19921226 | NO, (Saturday) | +1 |
| 19921227 | NO, (Sunday) | +1 |
| 19921228 | YES | +2 |
| 19921229 | YES | +3 |

| DATE | QUALIFICATION | COUNT |
| --- | --- | --- |
| 19921230 | YES | +4 |
| 19921231 | YES | +5 |

The function BEGINNING OF THE MONTH ±N DAYS (C/P 205) provides the date that is N days before or after the beginning of the month specified by the input date. Example 1 of FIG. 21 shows a call to this function to determine the date that is 5 days after the beginning of the month containing Jul. 23, 1994. The FROM-DATE is now defined as the beginning of July, i.e. Jul. 01, 1994. Then, according to the value of "T" assigned to END-PNTS-DEF, the FROM-DATE corresponds to a day count of zero. In Example 1, every day qualifies since the FUNCTION-TYPE is "C" and the days are counted as shown in the table below to provide the OUT1-DATE of 19940706:

| DATE | QUALIFICATION | COUNT |
| --- | --- | --- |
| 19940701 | N/A | 0 |
| 19940702 | YES | +1 |
| 19940703 | YES | +2 |
| 19940704 | YES | +3 |
| 19940705 | YES | +4 |
| 19940706 | YES | +5 |

In Example 2 the FUNCTION-TYPE is "P" so only processing days are counted. It happens that Jul. 4, 1994, the Fourth of July, is listed in holiday table 05, so the days are counted as shown in the table below to provide the OUT1-DATE of 19940711:

| DATE | QUALIFICATION | COUNT |
| --- | --- | --- |
| 19940701 | N/A | 0 |
| 19940702 | NO (Saturday) | 0 |
| 19940703 | NO (Sunday) | 0 |
| 19940704 | NO (Holiday) | 0 |
| 19940705 | YES | +1 |
| 19940706 | YES | +2 |
| 19940707 | YES | +3 |
| 19940708 | YES | +4 |
| 19940709 | NO (Saturday) | +4 |
| 19940710 | NO (Sunday) | +4 |
| 19940711 | YES | +5 |

The function END OF THE MONTH ±N DAYS (C/P 206) provides the date that is N days before or after the end of the month in which the FROM-DATE is located. Example 1 of FIG. 22 shows a call to this function to find the calendar date that is 4 days prior to the end of the month containing Dec. 05, 1992. The FROM-DATE is defined as the end of the month, i.e., Dec. 31, 1992. Then, according to the value of "T" assigned to END-PNTS-DEF, the FROM-DATE corresponds to day count zero. In Example 1, the FUNCTION-TYPE is "C" so every day qualifies and the days are counted as shown in the table below to provide OUT1-DATE of Dec. 27, 1992:

| DATE | QUALIFICATION | COUNT |
| --- | --- | --- |
| 19921231 | N/A | 0 |
| 19921230 | YES | −1 |
| 19921229 | YES | −2 |
| 19921228 | YES | −3 |
| 19921227 | YES | −4 |

Example 2 is the same as Example 2 except that the FROM-DATE is Dec. 18, 1992 and the function type is "P" so only processing days are calculated. The FROM-DATE is again Dec. 31, 1992, and the days are counted as shown below to provide the OUT1-DATE of Dec. 24, 1992:

| DATE | QUALIFICATION | COUNT |
| --- | --- | --- |
| 19921231 | N/A | 0 |
| 19921230 | YES | −1 |
| 19921229 | YES | −2 |
| 19921228 | YES | −3 |
| 19921227 | NO, (Sunday) | −3 |
| 19921226 | NO, (Saturday) | −3 |
| 19921225 | NO, (Holiday) | −3 |
| 19921224 | YES | −4 |

The function Nth DOW OCCURRENCE FORWARD/BACKWARD (C/P 207) provides the date that is the Nth of a specified day of week forward or backward from a reference date. In this function an END-PNTS-DEF value of T is implicitly utilized. Example 1 of FIG. 23 shows a call to this function to find the calendar date that is the second Friday prior to the date that is specified as the FROM-DATE of Dec. 28, 1992. IN-ALPHA-PARM has the value 'NNNNNYN', thereby specifying Friday as the day to be counted, and the second occurrence is specified by the IN-NUMERIC-PARM value of −2. Since the FUNCTION-TYPE is "C", Fridays are counted as shown in the table below to provide the OUT1-DATE of Dec. 18, 1992:

| DATE | QUALIFICATION | COUNT |
| --- | --- | --- |
| 19921228 | N/A | −0 |
| 19921225 | YES | −1 |
| 19921218 | YES | −2 |

In Example 2 is the same as Example 1 except that the FUNCTION-TYPE is "P" so only processing days are counted. The days are counted in the table below to provide the OUT1-DATE of Dec. 11, 1992:

| DATE | QUALIFICATION | COUNT |
| --- | --- | --- |
| 19921228 | N/A | 0 |
| 19921225 | NO (Holiday) | 0 |
| 19921218 | YES | −1 |
| 19921211 | YES | −2 |

Additionally, there are 288 advanced functions. These functions address questions such as "What date is three days prior to the end of the previous fiscal quarter?" The FUNCTION-TYPE for advanced functions is either "C" or "P", where "C" means that the system considers all calendar days, and "P" means that the system considers only processing days. The FUNCTION-NUMBER for advanced functions has a format "Fxx", where F ranges from 5 through 8, and the last two digits, "xx", range from 01 to 36. The F values of 5, 6, 7 and 8 correspond to functions termed the 500, 600, 700 and 800 series, respectively. The F digit identifies the type of calculation, and the last two digits of the FUNCTION-NUMBER identify the time period of interest.

FIGS. 24a–d graphically depict the calculations of the 500, 600, 700, and 800 series, respectively. In these figures 'START' indicates the starting date; a curved arrow labelled with a '1' indicates the determination of a second date at the beginning or end of a calendar or fiscal year, month or quarter; a curved arrow labelled with a '2' indicates the determination of a date that is a specified number of days from the origin of the arrow; a curved arrow labelled with a '3' indicates the determination of a date that is a specified number of a specified day of week from the origin of the arrow; and a straight arrow indicates the determination of the number of days from the origin of the arrow to the tip of the arrow.

As shown in FIG. 24a, the 500 series functions identify a date which is the beginning or end of a fiscal or calendar year, month or quarter. The 500 series functions are termed "DATE IDENTIFICATION" functions.

As shown in FIG. 24b, the 600 series identify a date which is a beginning or end of a calendar or fiscal year, month, or quarter, and determine the number of days to that date. The 600 series functions are termed "DAYS SINCE/UNTIL" functions.

The 700 series identify a date which is a beginning or end of a calendar or fiscal year, month or quarter, and calculate a TO-DATE a specified number of days from to that date, as shown in FIG. 24c. The 700 series functions are termed "DATE RELATIVE TO" functions.

The 800 series functions identify a date at the beginning or end of a calendar or fiscal year, month or quarter, and calculate the Nth occurrence of a specified day of week (DOW) from that date. The 800 series functions are therefore termed "Nth DOW WITHIN A PERIOD" functions. In the 800 series functions the END-PNTS-DEF value of "B" is implicitly utilized in counting the DOWs.

The last two digits of the FUNCTION-NUMBER identify the time period of interest. Below is a listing of the time periods corresponding to the numbers 1 through 36:

| TIME-PERIOD | | | FUNCTION-NUMBER |
|---|---|---|---|
| Calendar Year | Previous | Beginning | F01 |
| | Previous | End | F02 |
| | Current | Beginning | F03 |
| | Current | End | F04 |
| | Next | Beginning | F05 |
| | Next | End | F06 |
| Fiscal Year | Previous | Beginning | F07 |
| | Previous | End | F08 |
| | Current | Beginning | F09 |
| | Current | End | F10 |
| | Next | Beginning | F11 |
| | Next | End | F12 |
| Calendar Quarter | Previous | Beginning | F13 |
| | Previous | End | F14 |
| | Current | Beginning | F15 |
| | Current | End | F16 |
| | Next | Beginning | F17 |
| | Next | End | F18 |
| Fiscal Quarter | Previous | Beginning | F19 |
| | Previous | End | F20 |
| | Current | Beginning | F21 |
| | Current | End | F22 |
| | Next | Beginning | F23 |
| | Next | End | F24 |
| Calendar Month | Previous | Beginning | F25 |
| | Previous | End | F26 |
| | Current | Beginning | F27 |
| | Current | End | F28 |
| | Next | Beginning | F29 |
| | Next | End | F30 |

-continued

| TIME-PERIOD | | | FUNCTION-NUMBER |
|---|---|---|---|
| Fiscal Month | Previous | Beginning | F31 |
| | Previous | End | F32 |
| | Current | Beginning | F33 |
| | Current | End | F34 |
| | Next | Beginning | F35 |
| | Next | End | F36 |

The 500 series DATE IDENTIFICATION functions provide a date of particular interest. As shown in Example C51 of FIG. 25a, the "C" of the FUNCTION-TYPE C519 specifies the identification of the calendar beginning of a period. The last two digits of the FUNCTION-NUMBER specifies that the time period is the previous fiscal quarter from the FROM-DATE. The FROM-DATE is specified to be the current date, which in this case we assume to be May 17, 1993. Since FISCYR-START has a value of 04, the fiscal year is defined as starting April 1st. Since the current date lies in the first fiscal quarter, the beginning of the previous fiscal quarter is therefore Jan. 01, 1993, and OUT1-DATE has a value of 19930101.

Example P51 is the same as Example C51, except that the processing beginning of the previous fiscal quarter is requested. Since Friday, Jan. 01, 1993 happens to be a holiday in holiday table 08, and the processing day definition assigns Friday an "E", Jan. 01, 1993 is not considered a processing day. Therefore, a forward adjustment is performed by searching toward the future until a processing day is encountered. Saturday and Sunday are never processed according to the processing day definition, so the next processing day is Jan. 04, 1993, and the OUT1-DATE is assigned a value of 19930104.

In Example C52 of FIG. 25b, the function code C504 calls for the identification of the calendar end of the calendar year containing the FROM-DATE of Nov. 29, 1993. The calendar end of 1993 is Dec. 31, 1993, so the value of OUT1-DATE is 19931231. Example P52 is the same as Example C52, except that the processing end of the calendar year containing Nov. 29, 1993 is requested. Since it happens that Dec. 31, 1993, New Years Eve, is a holiday according to holiday table 08 and it is a Friday, it is not considered a processing day since PROC-DAY-DEF assigns Fridays an "E" value. Therefore, a backward adjustment is performed by searching toward the past until a processing day is encountered. Dec. 30, 1993 qualifies, and this is the answer returned by OUT1-DATE.

The 600 series DAYS SINCE/UNTIL functions provide a number that specifies the direction and displacement from the FROM-DATE to the specified date of interest. In Example C61 of FIG. 26a, the function C619 calls for a determination of the direction and displacement in calendar days from the current date to the calendar beginning of the previous fiscal quarter. Since the value 04 of FISCYR-START indicates that the fiscal year starts April 1st, the current date, which we assume to be May 17, 1993, lies in the first quarter. The beginning of the previous fiscal quarter is Jan. 01, 1993. Jan. 01, 1993 is therefore the effective TO-DATE and the system determines the direction and displacement in calendar days from May 17, 1993 to Jan. 01, 1993. The answer is −136 calendar days.

Example P61 of FIG. 26a is the same as Example C61, except that the direction and displacement in processing days from the current date to the processing beginning of the previous fiscal quarter is requested. Since Jan. 01, 1993 is a holiday according to holiday table 08 and is a Friday, it is not considered a processing day according to the PROC-DAY-DEF assignment of an "E" to Fridays. Therefore a forward adjustment is performed by searching toward the future until a processing day is encountered. Saturday and Sunday are not processing days, so a processing day does not occur until Jan. 04, 1993. That date becomes the effective TO-DATE and the system determines the direction and displacement in processing days from May 17, 1993 to Jan. 04, 1993. The answer is –95 processing days.

In Example C62 of FIG. 26b, the FUNCTION-CODE C604 calls for the identification of the direction and displacement in calendar days from Nov. 29, 1993 to the calendar end of the calendar year containing Nov. 29, 1993. The calendar end of 1993 is Dec. 31, 1993, which becomes the effective TO-DATE. The system then determines the direction and displacement in calendar days from Nov. 29, 1993 to Dec. 31, 1993. The answer is +32 calendar days.

Example P62 of FIG. 26b is the same as Example C62, except that the direction and displacement in processing days from Nov. 29, 1993 to the processing end of the calendar year containing Nov. 29, 1993 is requested. Since Friday Dec. 31, 1993 happens to be in holiday table 08, it is not considered a processing day. Therefore, a backward adjustment is performed by searching toward the past until a processing day is encountered. Dec. 30, 1993 qualifies, so it becomes the effective TO-DATE. The system then determines the direction and displacement, in processing days, from Nov. 29, 1993 to Dec. 30, 1993. The answer is +22 processing days.

The 700 series DATE RELATIVE TO functions provide a date that is determined by starting at a calendar date of particular interest, and advancing forward or backward a specified number of days. In Example C71 of FIG. 27a, the FUNCTION CODE C719 calls for the determination of the date that is +5 calendar days from the calendar beginning of the previous fiscal quarter. Since the fiscal year starts April 1st as indicated by the FISCYR-START value of 04, the current date which we assume to be May 17, 1993, lies in the first fiscal quarter. The beginning of the previous fiscal quarter is Jan. 01, 1993 so that date becomes the effective FROM-DATE. The system calculates the date +5 calendar days from the FROM-DATE, and the answer is Jan. 06, 1993.

Example P71 of FIG. 27a is the same as the Example C71, except that the date requested is +5 processing days from the processing beginning of the previous fiscal quarter. Since Jan. 01, 1993 is a Friday and is a holiday according to holiday table 08, it is not considered a processing day. Therefore a forward adjustment is performed by searching toward the future until a processing day is encountered. Saturday and Sunday are never processed according to the PROC-DAY-DEF value of NEEEEEN, so a processing day does not occur until Jan. 04, 1993. The system then calculates the date that is +5 processing days from the new FROM-DATE of Jan. 04, 1993 and the answer is Jan. 11, 1993.

In Example C72 of FIG. 27b, the FUNCTION-CODE C704 calls for the identification of the date that is –6 calendar days from the calendar end of the calendar year containing the FROM-DATE of Nov. 29, 1993. The calendar end of 1993, Dec. 31, 1993, becomes the effective FROM-DATE, and the system then calculates the date that is –6 calendar days from Dec. 31, 1993. The answer is Dec. 25, 1993. Example P72 is the same as Example C72, except that since the FUNCTION-TYPE is a P the date requested is –6 processing days from the processing end of the calendar year containing Nov. 29, 1993. Since Dec. 31, 1993 is a holiday and it's a Friday, it is not considered a processing day. Therefore, a backward adjustment is performed by searching toward the past until a processing day is encountered. Dec. 30, 1993 qualifies according holiday table 08, so it becomes the effective FROM-DATE. The system then calculates the date that is –6 processing days from the FROM-DATE yielding the answer Dec. 21, 1993.

The series 800 Nth DOW OCCURRENCE WITHIN A PERIOD functions are executed in three stages: (1) the desired period beginning or end specified by the last two digits of the FUNCTION-NUMBER is determined relative to the FROM-DATE; (2) the system counts forward from the beginning of the period or backward from the end of the period the number of days specified by IN-NUMERIC-PARM, tallying only the days of week specified by PROC-DAY-DEF, END-PNTS-DEF, and IN-ALPHA-PARM; and (3) the system checks that the answer is still within the period specified in the first stage.

In Example C81 of FIG. 28a, the FUNCTION-CODE C827 calls for the determination of a date relative to the calendar beginning of the current calendar month since the last two digits of the FUNCTION-NUMBER are 27, and the FUNCTION-TYPE is C. Since IN-NUMERIC-PARM is +4 and the value of IN-ALPHA-PARM is 'NNNNNYN', the requested date is the 4th calendar Friday after the calendar beginning of the calendar month containing the FROM-DATE of Dec. 15, 1992. The calendar beginning of the calendar month containing Dec. 15, 1992 is Dec. 01, 1992. The system counts forward 4 calendar Fridays until it reaches Dec. 25, 1992, which becomes the answer.

Example P81 is the same as Example C81, except that since the FUNCTION-TYPE is P, the date that is the 4th processing Friday after they processing beginning of the calendar month containing Dec. 15, 1992 is requested. The analysis starts out, as before, with Dec. 01, 1992. However this time, when the system counts ahead 4 processing Fridays, it must skip Friday, Dec. 25, 1992 (Christmas) since it happens to be listed in holiday table 08, and therefore not a processing day. The actual answer, therefore lies in January, which results in an error message, because the desired answer is beyond the end of the specified period.

Example C82 of FIG. 28b is the same as Example C81 of FIG. 28a except that the FUNCTION-CODE C828 calls for the determination of a date relative to the calendar end of the current calendar month, and the value of IN-NUMERIC-PARM is –4 rather than +4. Since IN-ALPHA-PARM is 'NNNNNYN' and the FROM-DATE is Dec. 15, 1992, the requested date is the 4th calendar Friday prior to the calendar end of the calendar month containing Dec. 15, 1992. The calendar end of the calendar month containing Dec. 15, 1992 is Dec. 31, 1992. The system then counts backward four calendar Fridays until it reaches Dec. 04, 1992, which is therefore the answer.

Example P82 of FIG. 28b is the same as Example C82, except that since the FUNCTION-CODE is P, the date requested is the 4th processing Friday prior to the processing end of the calendar month in which the FROM-DATE of Dec. 15, 1992 occurs. The analysis starts out, as before, with Dec. 31, 1992. However this time, when the system counts backwards 4 processing Fridays, it must again skip Friday, Dec. 25, 1992 because it is not a processing day. The answer, therefore lies in November. This results in an error message because the desired answer is earlier than the beginning of the specified period.

In summary, an apparatus and method for accurate calendaring has been described. The present invention has been described in terms of a preferred embodiment. The invention, however, is not limited to the particulars of the embodiment depicted and described. Rather, the scope of the invention is defined by the appended claims.

What is claimed is:

1. In a computer system, a calendaring apparatus, comprising:

date input means for assigning a first date having a first year, a first day of year, a first month and a first day of month to a first date register, and a second date to a second date register;

first computation means for generating a first day of week corresponding to said first date and storing said first day of week in a first day-of-week register;

counter register initialization means for setting a counter number in a counter register to zero;

function control means for assigning to a function register a function parameter selected from a first set of parameters whose elements include a calendar day function parameter and a processing day function parameter;

seven day-of-week control registers;

processing day control means for assigning a processing day definition parameter from a second set of parameters to each of said seven day-of-week control registers, said second set of parameters including an always-a-processing-day parameter;

date incrementation means for repeatedly advancing said first date in said first date register by one day towards said second date while said first date is not equal to said second date;

day-of-week incrementation means for repeatedly updating said first day of week in said first day-of-week register by one day of week to correspond to said first date;

counter register incrementation means for incrementing said counter number in said counter register for an advancement of said first date by said date incrementation means if said calendar day function parameter is assigned to said function parameter register, and for incrementing said counter number in said counter register for an advancement by said date incrementation means of said first date if said processing day function parameter is assigned to said function parameter register, and if said always-a-processing-day parameter has been assigned to one of said day-of-week control registers corresponding to said first day of week; and display means for displaying said counter number in said counter register when said first date in said first date register is equal to said second date in said second date register.

2. The calendaring apparatus of claim 1 wherein said second set of parameters includes a never-a-processing-day parameter, a processing-day-only-if-not-a-holiday parameter, and a processing-day-only-if-a-holiday parameter; and further including a holiday table control means for selecting a particular holiday table file from a list of holiday table files, said particular holiday table file containing a list of holiday dates; and wherein said counter register incrementation means increments said counter number in said counter register for an advancement of said first date by said date incrementation means if said processing day function parameter has been assigned to said function register, if said processing-day-only-if-not-a-holiday parameter has been assigned to one of said day-of-week control registers corresponding to said first day of week, and if said first date is not one of said holiday dates; and wherein said counter register incrementation means increments said counter number in said counter register for advancement of said first date by said date incrementation means if said processing day function parameter has been assigned to said function register, if said processing-day-only-if-a-holiday parameter has been assigned to one of said day-of-week control registers corresponding to said first day of week, and if said first date is one of said holiday dates.

3. The calendaring apparatus of claim 2 wherein only one of said day-of-week control registers is assigned said processing-day-only-if-not-a-holiday parameter and all others of said day-of-week control registers are assigned said never-a-processing-day parameter, whereby a number of occurrences of a day week corresponding to said only bone day-of-week control register between said first and second dates is counted.

4. The calendaring apparatus of claim 2 further including;

an endpoints selection means for assigning to an endpoints register an endpoints parameter selected from a third set of parameters for defining treatment of a first and a second endpoint, said third set of parameters including a "B" parameter indicating that both of said endpoints be counted, an "F" parameter indicating that only said first end point be counted, an "N" parameter indicating that neither of said endpoints be counted, and a "T" parameter indicating that only said second endpoint be counted;

wherein said counter register incrementation means increments said counter number in said counter register prior to said date incrementation means repeatedly advancing said first date if said endpoints definition is said "B" or "F" parameter;

wherein said counter register incrementation means increments said counter number in said counter register if said calendar day function parameter has been assigned to said function register, if said first date is equal to said second date, and if said endpoints parameter is said "B" or "T" parameter;

wherein said counter register incrementation means increments said counter number in said counter register if said processing day function parameter has been assigned to said function register, if said always-a-processing-day parameter has been assigned to one of said day-of-week control registers corresponding to said first day of week, if said first date is equal to said second date, and if said endpoints parameter is said "B" or "T" parameter;

wherein said counter register incrementation means increments said counter number in said counter register if said processing day function parameter has been assigned to said function register, if said processing-day-only-if-not-a-holiday parameter has been assigned to one of said day-of-week control register corresponding to said first day of week, if said first date is not one of said holiday dates, if said first date is equal to said second date, and if said endpoints parameter is said "B" or "T" parameter;

wherein said counter register incrementation means increments said counter number in said counter register if said processing day function parameter has been assigned to said function register, if said processing-day-only-if-a-holiday parameter has been assigned to one of said day-if-week control registers corresponding to said first day of week, if said first date is one of said holiday dates, if said first date is equal to said second date, and if said endpoints parameter is said "B" or "T" parameter.

5. The calendaring apparatus of claim 2 further including:
fiscal calendar time unit means for assigning a fiscal calendar time unit parameter to a fiscal calendar time unit register; and
wherein said date input means includes a means for setting said second date equal to an endpoint of a fiscal calendar time unit corresponding to said fiscal calendar time unit parameter and containing said first date.

6. The calendaring apparatus of claim 2 further including:
fiscal calendar time unit means for assigning a fiscal calendar time unit parameter to a fiscal calendar time unit register; and
wherein said date input means includes a means for setting said second date equal to an endpoint of a first fiscal calendar time unit previous to a second fiscal calendar time unit containing said first date, and said first and second fiscal calendar time units correspond to said fiscal calendar time unit parameter.

7. The calendaring apparatus of claim 2 further including:
fiscal calendar time unit means for assigning a fiscal calendar time unit parameter to a fiscal calendar time unit register; and
wherein said data input means includes a means for setting said second date equal to an endpoint of a first fiscal calendar time unit subsequent to a second fiscal calendar time unit containing said first date, and said first and second fiscal calendar time units correspond to said fiscal calendar time unit parameter.

8. The calendaring apparatus of claim 2 further including:
means for assigning a Gregorian calendar time unit to Gregorian calendar time unit register; and
wherein said date input means includes a means for setting said second date equal to an endpoint of a Gregorian calendar time unit corresponding to said Gregorian calendar time unit parameter and containing said first date.

9. The calendaring apparatus of claim 2 further including:
means for assigning a Gregorian calendar time unit to a Gregorian calendar time unit register; and
wherein said date input means includes a means for setting said second date equal to an endpoint of a first Gregorian calendar time unit previous to a second Gregorian calendar time unit containing said first date, said first and second Gregorian calendar time units corresponding to said Gregorian calendar time unit parameter.

10. The calendaring apparatus of claim 2 further including:
means for assigning a Gregorian calendar time unit to a Gregorian calendar time unit register; and
wherein said date input means includes a means for setting said second date equal to an endpoint of a first Gregorian calendar time unit subsequent to a second Gregorian calendar time unit containing said first date, said first and second Gregorian calendar time units corresponding to said Gregorian calendar time unit parameter.

11. The calendaring apparatus of claim 1 wherein said date input means includes means for inputting a first digit field specifying said first year of said first date, and means for inputting at least one additional digit field specifying said day of year of said first date.

12. The calendaring apparatus of claim 1 further including:
means for specifying a correspondence between unique first, second, third, fourth, fifth, sixth and seventh integers and days of week Monday, Tuesday, Wednesday, Thursday, Friday, Saturday and Sunday; and
means for displaying one of said unique integers corresponding to said first day of week.

13. The calendaring apparatus of claim 1, further comprising:
date format selection means for assigning a date field format mask parameter from a set of format mask parameters, including a Gregorian format mask parameter and a Julian format mask parameter, to a date format mask register; and
a display device for displaying said first year in a first digit field, said first month in a second digit field and said first day of month in a third digit field if said Gregorian format mask parameter is assigned to said date format mask register, and displaying said first year in a fourth digit field and said first day of year in a fifth digit field if said Julian format mask parameter is assigned to said date format mask register.

14. The calendaring apparatus of claim 13 further including a means for controlling an order of display of said first, second and third digit fields.

15. The calendaring apparatus of claim 13 further including a means for controlling an order of display of said fourth and fifth digit fields.

16. The calendaring apparatus of claim 13 further including:
date field justification assignment means for assigning a date field justification parameter to a date field justification register, said date field justification parameter being chosen from a set of date field justification parameters including a left justification parameter and a right justification parameter; and
date field justification means for left justifying a display of said first date on said display device if said left justification parameter is assigned to said date field justification register, and right justifying said display of said first date in said display device if said right justification parameter is assigned to said date field justification register.

17. The calendaring apparatus of claim 13 further including a means for selecting a first number of digits in said first and fourth digit fields.

18. In a computer system, a calendaring apparatus for date calculations based on a first date having a first year and a first Julian day, comprising:
first absolute days register for storing a first number of absolute days, said first absolute days register being initialized to zero;
first year register initialized to said first year;
first Julian day register for storing said first Julian day;
first year register decrement means; and
first absolute days increment means;
and wherein
said first absolute days increment means adds 1,168,775 to said first number of absolute days in said first absolute days register for each multiple of 3200 in said first year and said first year register decrement means sets said first year in said first year register equal to said first year modulo 3200, after which said first absolute days increment means adds 146,097 to said first number of absolute days in said first absolute days register for each multiple of 400 in said first year and said first year register decrement means sets said first year in said first year register equal to said first year modulo 400, after which said first absolute days increment means adds 36,524 to said first number of absolute days in said first absolute days register for each multiple of 100 in said first year and said first year register decrement means sets said first year in said first year register equal to said first year modulo 100, after which said first absolute days increment means adds 1,461 to said first number of absolute days in said first absolute days register for each multiple of 4 in said first year and said first year register decrement means sets said first year in said first year register equal to said first year modulo 4, after which said first absolute days increment means adds the product of 365 and said first year to said first number of absolute days in said first absolute days register and said first absolute days increment means adds said first Julian day to said first number of absolute days in said first absolute days register, whereby said first number of absolute days corresponds to said first date.

19. The calendaring apparatus of claim 18 further comprising means for determining a remainder equal to said first number of absolute days in said first absolute days register modulo 7.

20. The calendaring apparatus of claim 18 for date calculations based on a second date having a second year and a second Julian day, further comprising:

second absolute days register for storing a second number of absolute days, said second absolute days register being initialized to zero;

second year register initialized to said second year;

second Julian day register for storing said second Julian day;

second year register decrement means; and second absolute days increment means; and wherein said second absolute days increment means adds 1,168,775 to said second number of absolute days in said second absolute days register for each multiple of 3200 in said second year and said second year register decrement means sets said second year in said second year register equal to said second year modulo 3200, after which said second absolute days increment means adds 146,097 to said second number of absolute days in said second absolute days register for each multiple of 400 in said second year and said second year register decrement means sets said second year in said second year register equal to said second year modulo 400, after which said second absolute days increment means adds 35,524 to said second number of absolute days in said second days register for each multiple of 100 in said second year and said second year register decrement means sets said second year in said second year register equal to said second year modulo 100, after which said second absolute days increment means adds 1,461 to said second number of absolute days in said second absolute days register for each multiple of 4 in said second year and said second year register decrement means sets said second year in said second year register equal to said second year modulo 4, after which said second absolute days increment means adds the product of 365 and second year to said second number of absolute days in said second absolute days register and said second absolute days increment means adds said second Julian day to said second number of absolute days in said second absolute days register, whereby said second number of absolute days corresponds to said second date, and further including means for subtracting said first number of absolute days in said first absolute days register from said second number of absolute days in said second absolute days register to provide a difference equal to a number of calendar days between said first and second dates.

21. The calendaring apparatus of claim 19 wherein a day of week is assigned to said first date such that values of said remainder of 0, 1, 2, 3, 4, 5, and 6 correspond respectively to Sunday, Monday, Tuesday, Wednesday, Thursday, Friday and Saturday.

22. In a computer system, a calendaring apparatus comprising:

a leap year register initialized to have a non-leap year indicator;

first date register for storing a first year and a first day of year; counter register storing a counter number initialized to zero;

second date register for storing a second date;

modulo values determining means for determining modulo-3200, modulo-400, modulo-100, and modulo-4 values of said first year;

leap year register set means including a comparing means for comparing a pair of said modulo values of said first year and an assignment means for assigning an indicator to said leap year register, said assignment means setting said leap year register to a leap year indicator if said comparing means determines that said modulo-4 value is zero and said modulo-100 value is nonzero, said assignment means setting said leap year register to said non-leap year indicator if said comparing means determines that said modulo-100 value is zero and said modulo-400 value is nonzero, said assignment means setting said leap year register to said leap year indicator if said comparing means determines said modulo-400 value is zero and said modulo-3200 value is nonzero, and said assignment means setting said leap year register to said non-leap year indicator if said modulo-3200value is zero;

counter/date advancement means for repeatedly advancing said counter number in said counter register and said first date having said first year and said first day of year towards said second date while said first date is not equal to said second date, if said first date is February 28 and said leap year register stores said leap year indicator then said first date is advanced to February 29, if said first date is February 28 and said leap year register stores said non-leap year indicator then said first date is advanced to March 1; and display means for displaying said counter number in said counter register when said first date equals said second date, whereby said counter number represents a quantity of days between said first date and said second date accurate for said first and second dates being between Jan. 1, 0001 and Dec. 31, 9999.

23. The calendaring apparatus of claim 22 wherein said leap year register set means assigns said indicator to said leap year register whenever said counter/date advancement means changes said first year.

24. In a computer system, a calendaring apparatus comprising:

counter register;

first storage register for storing a first date having a first year of century;

second storage register for storing a second date a displacement direction from said first date;

counter initialization means for initializing said counter number in said counter register to zero;

endpoint definition means for assigning an endpoint definition parameter to an endpoint definition register, said endpoint definition parameter being selected from a set of endpoint definition parameters including a "B" value indicating that both said first date and said second date be counted, an "N" value indicating that neither said first date nor said second date be counted, an "F" value indicating that said first date but not said second date be counted, and a "T" value indicating that said second date but not said first date be counted;

date/counter incrementation means, said date/counter incrementation means initially incrementing said first date in said first storage register in said displacement direction without incrementing said counter number in said counter register if said "N"or said "T" value is selected, said date/counter incrementation means generating repeated incrementations of said first date in said first storage register in said displacement direction and corresponding incrementations of said counter number in said counter register while said first date in said first storage register is not equal to said second date in said second storage register, and said date/counter incrementation means incrementing said counter number in said counter register when said first date in said first storage register is equal to said second date in said second storage register if said "B" or "T" values is selected; and a display means for displaying said counter number.

25. The calendaring apparatus of claim 24 further comprising:

default century storage register for storing a first default century;

century breakpoint storage register;

century breakpoint assignment means for assigning a year of century breakpoint to said century breakpoint storage register;

century assignment means for assigning said first default century to said default century storage register if said first year of century is less than said year of century breakpoint, and for assigning a second default century, equal to said first default century plus one, to said default century storage register if said first year of century is not less than said year of century break point.

26. The calendaring apparatus of claim 24, further including a calling program for calendaring calculations and a utility used in conjunction with said calling program, said utility including:

means for receiving control of a calendaring request from said calling program, said request including a literal representing a nominal current date;

means for obtaining said nominal current date from said calling program;

means for computing an answer to said calendaring request based on said nominal current date; and means for transferring said answer to said calling program.

27. The calendaring apparatus of claim 26 wherein said calling program obtains said nominal current date from a data file.

28. The calendaring apparatus of claim 26 wherein said calling program obtains said nominal current date from a database.

29. In a computer system, a calendaring apparatus comprising:

first date storage register;

first date assignment means for assigning a first date having a first year and a first day of year to said first date storage register;

day of week generation means for generating a first day of week corresponding to said first date;

counter register storing a counter number initialized to zero;

distance register;

direction register;

distance assignment means for assigning an integer distance to said distance register;

direction assignment means for assigning a direction to said direction register;

function register;

function assignment means for assigning a function parameter from a first set of function parameters, whose elements include a calendar day function parameter and a processing day function parameter, to said function register;

seven processing day definition registers;

processing day definition assignment means for assigning a processing day definition parameter, if said processing day function is selected, from a set of processing day definition.

30. The calendaring apparatus of claim 29 further including:

a holiday table register; and holiday table assignment means for assigning a holiday table parameter to said holiday table register, a holiday table file corresponding to said holiday table parameter containing a list of holiday dates; and wherein for each of incrementation of said first date said counter incrementation means increments said counter number in said counter register
  if said processing day parameter has been assigned to said function register, if said processing-day-only-if-not-a-holiday has been assigned to said processing day definition register corresponding to said first day of week, and if said first date is not one of said holiday date; or
  if said processing day parameter has been assigned to said function register, is said processing-day-only-if-a-holiday parameter has been assigned to said processing day definition register corresponding to said first day of week, and if said first date is one of said holiday dates.

31. The method of claim 30 wherein only one of said seven processing day definition register is assigned said processing-day-only-if-not-a-holiday parameter, and all others of said seven processing day definition registers are assigned said never-a-processing-day, parameter, whereby a second date said integer distance number of occurrences of a day of week, corresponding to said only one of said seven processing day definition register, from said first date is determined.

32. The calendaring apparatus of claim 30 further including:

endpoint definition assignment means for assigning to an endpoint definition register an endpoints parameter selected from a set of endpoint parameters including a "B" parameter indicating that both a first and a second endpoint be counted, an "F" parameter indicating that only said first endpoint be counted, and "N" parameter indicating that neither said first endpoint nor said second endpoint be counted, and a "T" parameter indicating that only said second endpoint be counted; and wherein said date incrementation means initially advances said first date in said first date storage register by one day without said counter incrementation means incrementing said counter number in said counter register prior to said date incrementation means repeatedly incrementing said first date in said first date storage register if said endpoints parameter is said "T" or "N" parameter;

said date incrementation means advances said first date in said first date storage register by one day without said counter incrementation means incrementing said counter number in said counter register subsequent to said date incrementation means repeatedly incrementing said first date in said first date storage register if said endpoints parameter is said "F" or "N" parameter and said calendar day function parameter is assigned to said function register;

said counter incrementation means increments said counter number in said counter register for each advancement of said first date of if said always-a-processing-day parameter has been assigned to one of said seven processing day definition registers corresponding to said first day of week;

said counter number in said counter register for each advancement of said first date if said processing-day-only-if-not-a-holiday parameter has been assigned to one of said seven processing day definition registers corresponding to said first day of week, and said first date is not one of said holiday date; and said counter incrememtation means increments said counter number in said counter register for each advancement of said first date if said processing-day-only-if-a-holiday parameter has been assigned to one of said seven processing day definition registers corresponding to said first day of week, and said first date is one of said holiday dates.

33. The calendaring apparatus of claim 30 wherein said first date assignment means includes:

means for selecting a fiscal calendar time unit;

means dfor defining endpoints of said fiscal calendar time unit; and means for selecting a second date; and wherein said first date assignment means sets said first date equal to one of said endpoints of a period of said fiscal calendar time unit containing said second date.

34. The calendaring apparatus of claim 30 wherein said first date assignment means includes:

means for selecting a fiscal calendar time unit;

means for defining endpoints of said fiscal calendar time unit; and means for selecting a second date; and wherein said first date assignment means sets said first date equal to one of said endpoints of a first period of said fiscal calendar time unit previous to a second period of said fiscal calendar time unit containing said second date.

35. The calendaring apparatus of claim 30 wherein said first date assignment means includes:

means for selecting a fiscal calendar time unit;

means for defining endpoints of said fiscal calendar time unit; and means for selecting a second date; and wherein said first date assignment means sets said first date equal to one of said endpoints of a first period of said fiscal calendar time unit subsequent to a second period of said fiscal calendar time unit containing said second date.

36. The calendaring apparatus of claim 30 wherein said first date assignment means includes:

means for selecting a Gregorian calendar time unit having endpoints; and means for selecting a second date; and wherein said first date assignment means sets said first date equal to one of said endpoints of a period of said Gregorian calendar time unit containing said second date.

37. The calendaring apparatus of claim 30 wherein said first date assignment means includes:

means for selecting a Gregorian calendar time unit having endpoints;

means for selecting a second date; and wherein said first date assignment means sets said first date equal to one of said endpoints of a first period of said Gregorian calendar time unit previous to a second period of said Gregorian calendar time unit containing said second date.

38. The calendaring apparatus of claim 30 wherein said first date assignment means includes:

means for selecting a Gregorian calendar time unit having endpoints;

means for selecting a second date; and wherein said first date assignment means sets said first date equal to one of said endpoints of a first period of said Gregorian calendar time unit subsequent to a second period of said Gregorian calendar time unit containing said second date.

39. The calendaring apparatus of claim 29 wherein said first date assignment means includes:

means for inputting a first digit field specifying said first year of said first date, and inputting at least one additional digit field specifying said day of year of said first date.

40. The calendar apparatus of claim 29 further including:

means for specifying a correspondence between unique first, second, third, fourth, fifth, sixth and seventh integers and days of week Monday, Tuesday, Wednesday, Thursday, Friday, Saturday and Sunday;

display means for displaying one of said unique integers corresponding to said first day of week.

* * * * *